United States Patent [19]
Arimura et al.

[11] 3,969,755
[45] July 13, 1976

[54] EQUIPMENT FOR RECORDING AND REPRODUCING COLOR TELEVISION SIGNAL

[75] Inventors: Ichiro Arimura, Kyoto; Hiroshi Taniguchi, Hirakata; Chojuro Yamamitsu, Kawanishi, all of Japan

[73] Assignee: Matsushita Electric Industrial Co., Ltd., Japan

[22] Filed: Oct. 7, 1974

[21] Appl. No.: 512,206

[52] U.S. Cl. .................................................. 358/4
[51] Int. Cl.² ........................................... H04N 5/76
[58] Field of Search ............... 360/61, 62; 358/4, 8, 358/9; 325/311

[56] References Cited
UNITED STATES PATENTS

| | | | |
|---|---|---|---|
| 3,580,990 | 5/1971 | Numakura | 358/4 |
| 3,681,518 | 8/1972 | Hidaka et al. | 358/4 |
| 3,749,835 | 7/1973 | Arimura et al. | 358/8 |
| 3,757,034 | 9/1973 | Fujita | 358/4 |

*Primary Examiner*—Robert L. Griffin
*Assistant Examiner*—R. John Godfrey
*Attorney, Agent, or Firm*—Burgess Ryan and Wayne

[57] ABSTRACT

An equipment for recording and reproducing color television signals or VTR (video tape recorder) is combined with a color television receiver as a single unit in such a way that some of their circuits are used in common with both the VTR and receiver, whereupon the circuit design as well as operation may be greatly simplified. The VTR and receiver are operatively coupled to each other through a switch for selecting a recording or reproducing mode. In recording mode, the video signal, which is received and detected by the receiver, passes through the mode selction switch to the luminance signal processing circuit and the carrier chrominance signal processing circuit in the receiver. The separated luminance and chrominance signals are applied to the input terminal of the VTR so that they may be recorded while one is watching the picture on a picture tube. In the reproduction mode, the luminance and chrominance signals derived from the output of the VTR are added and applied to the input terminal of the processing circuits in the receiver through the mode selection switch so that they are processed in the signal processing circuits to reproduce the picture on the picture tube. In one embodiment of the present invention, the luminance and chrominance signals may be applied to their processing circuits, respectively, in the receiver through another selection switch. An APC type or a ringing type circuit is used for color synchronization. In order to minimize the effects caused by the jitter in the VTR, a feedback loop including the reproduction circuit of the VTR is provided. In the APC (automatic phase control) circuits, the crystal oscillator and/or LC oscillator are used.

9 Claims, 28 Drawing Figures

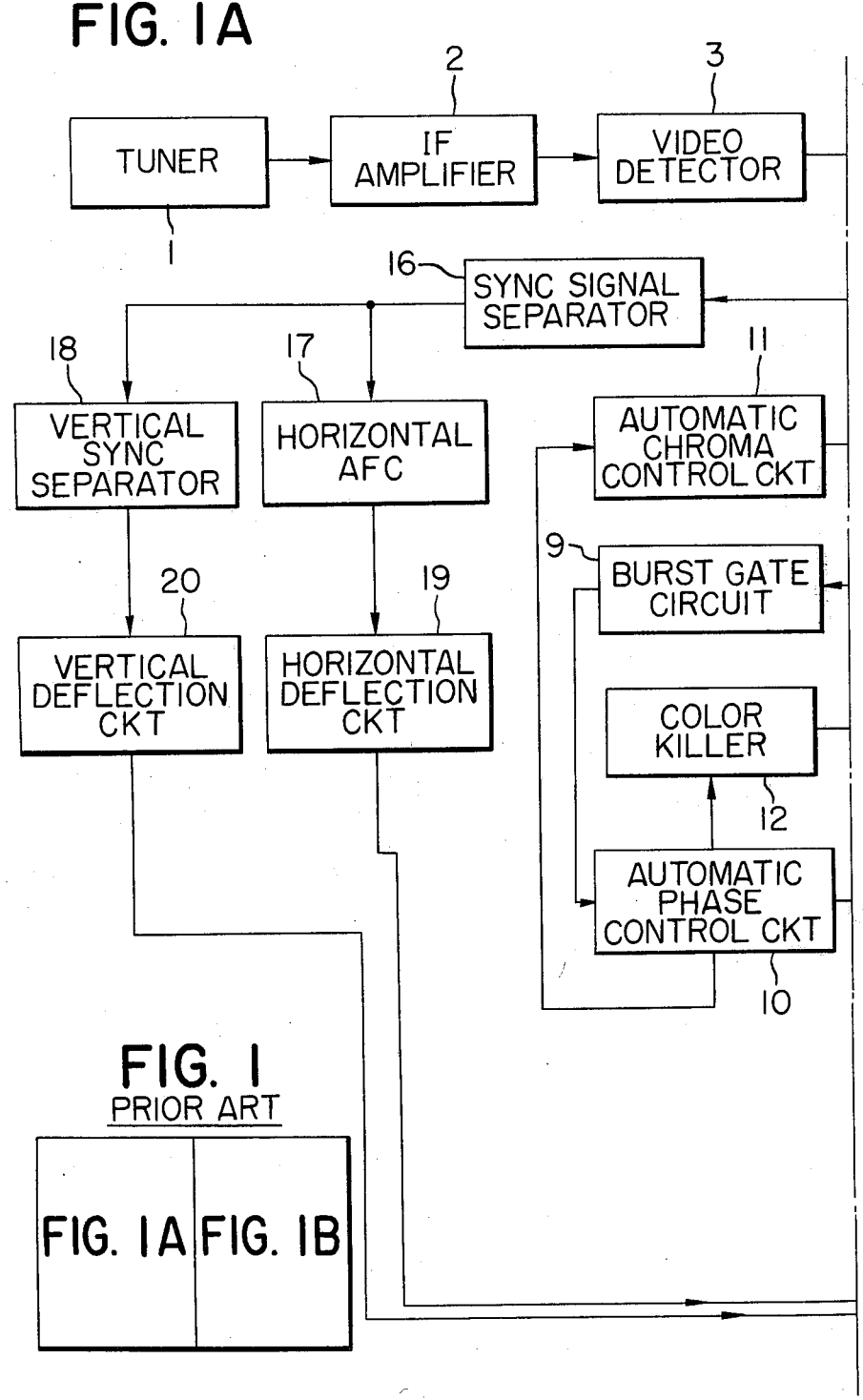

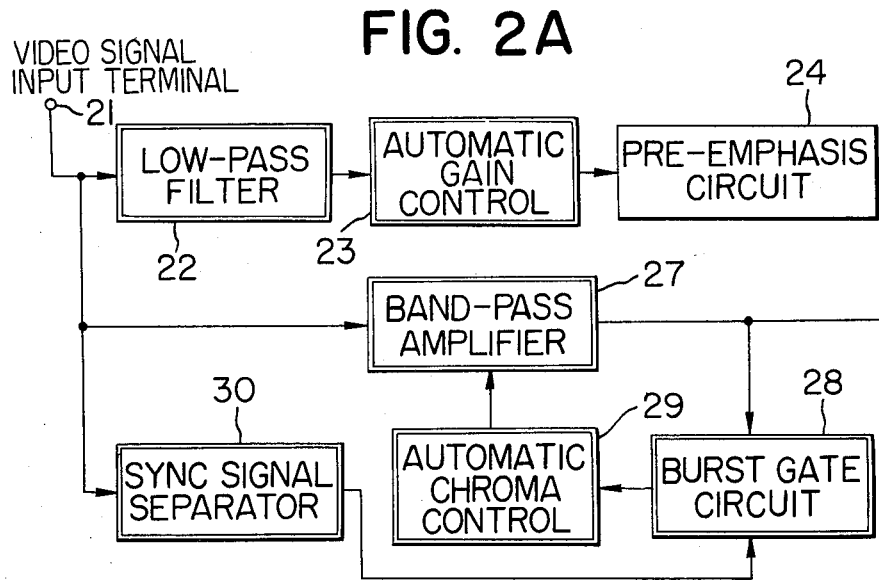
FIG. 2A
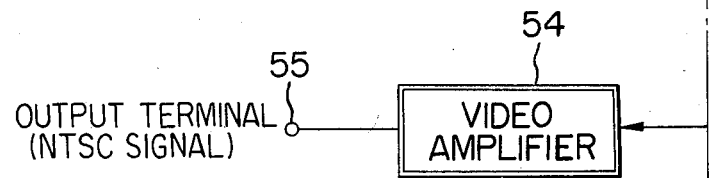
FIG. 2
PRIOR ART
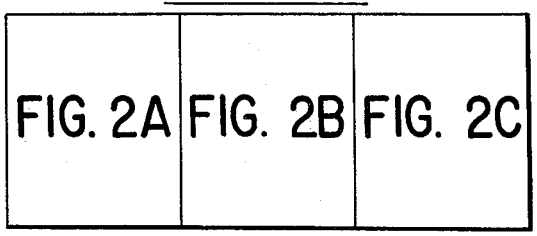

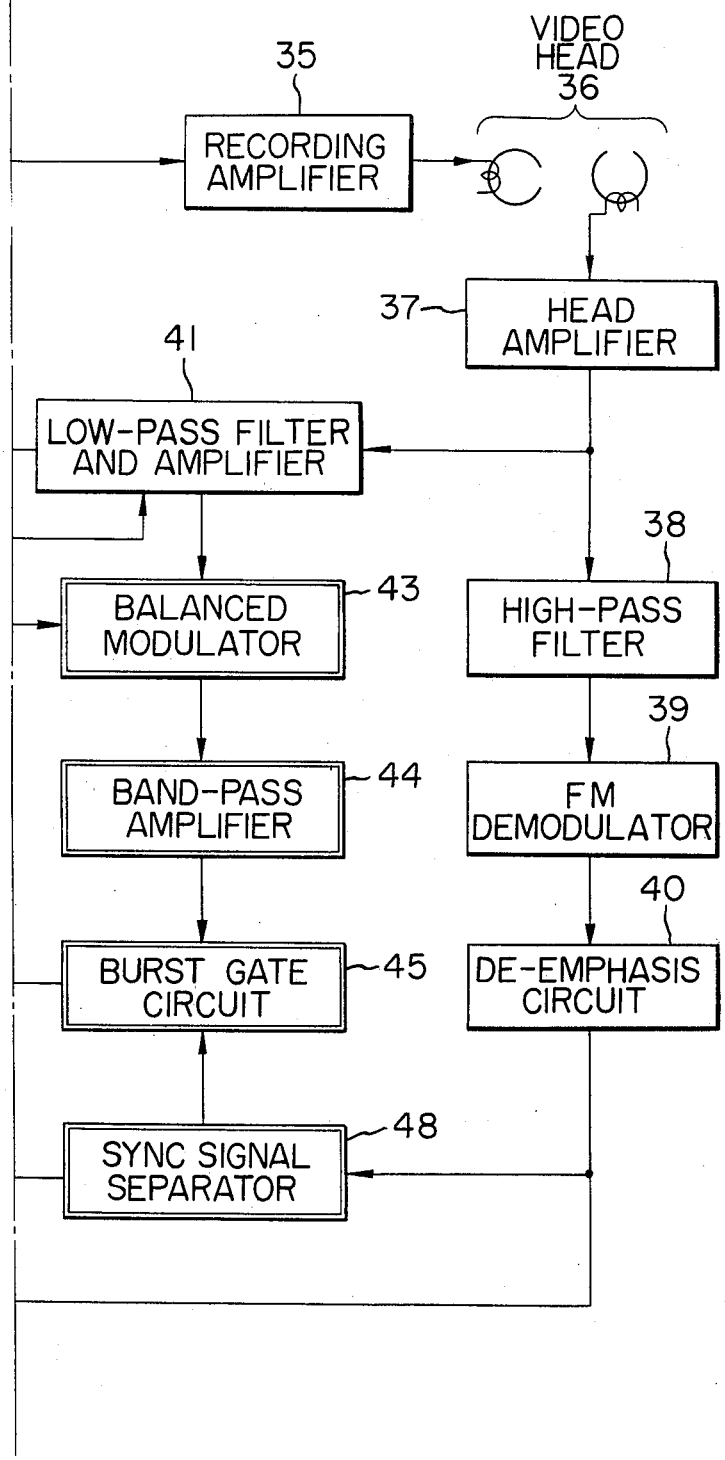

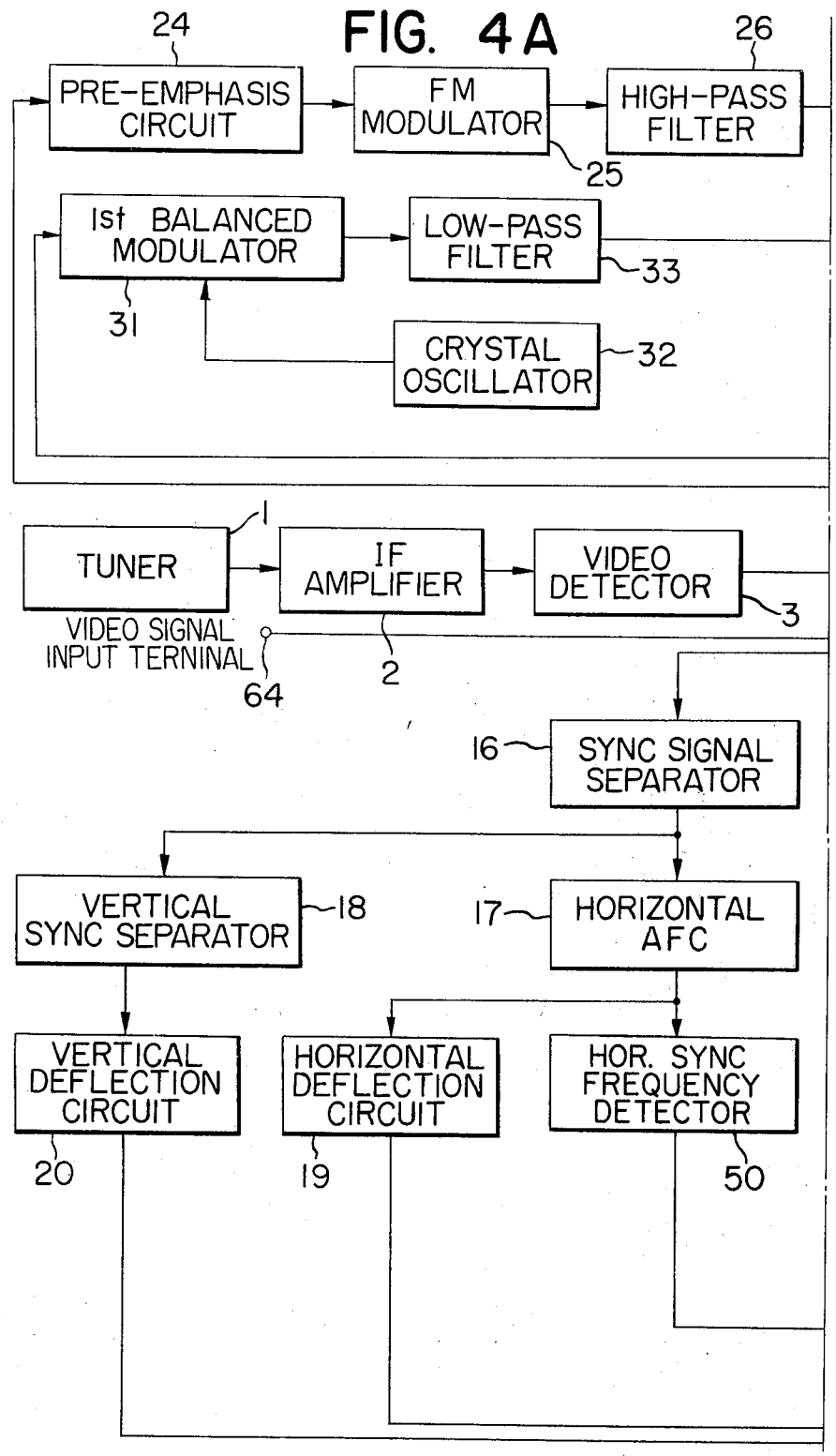

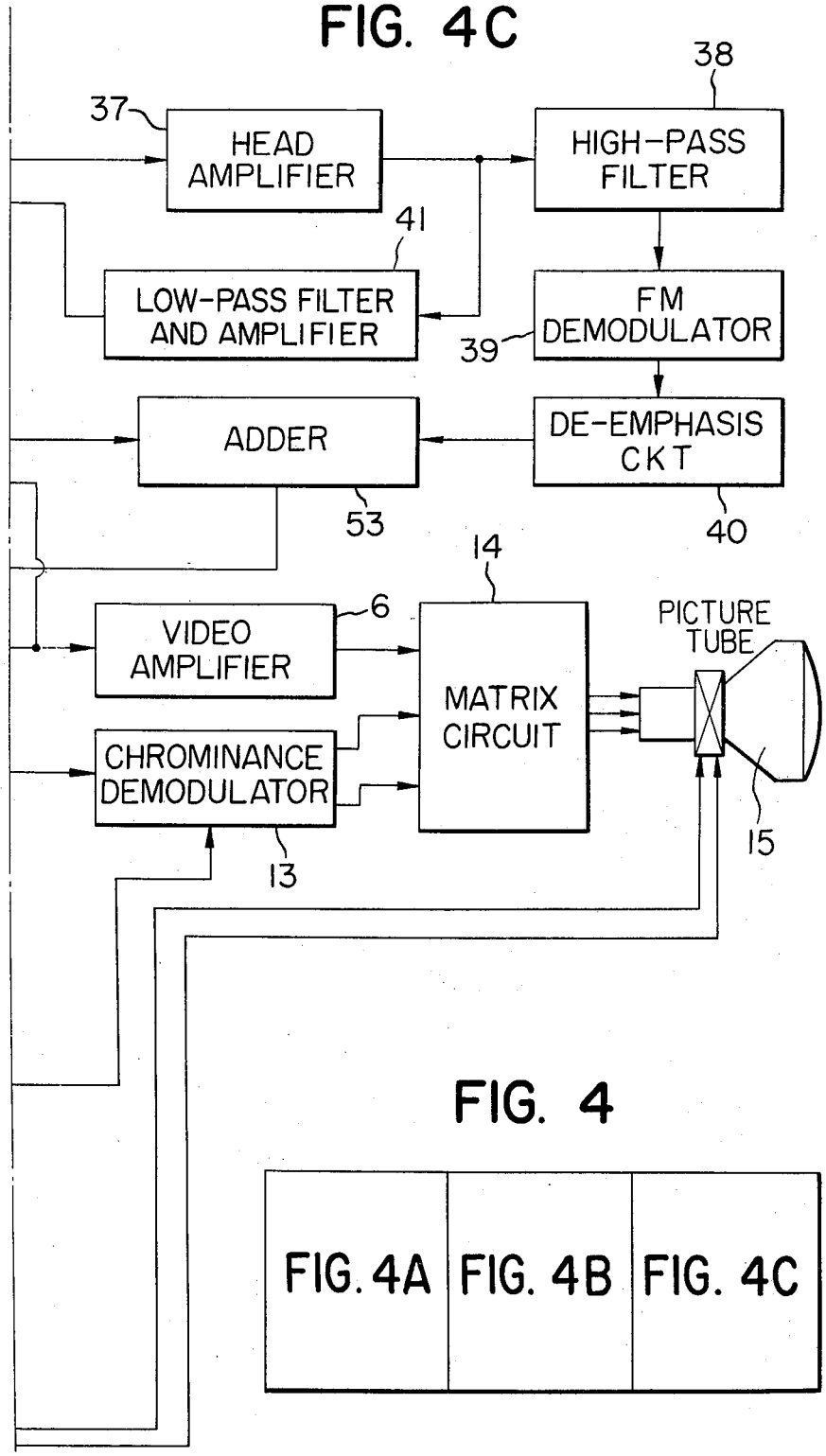

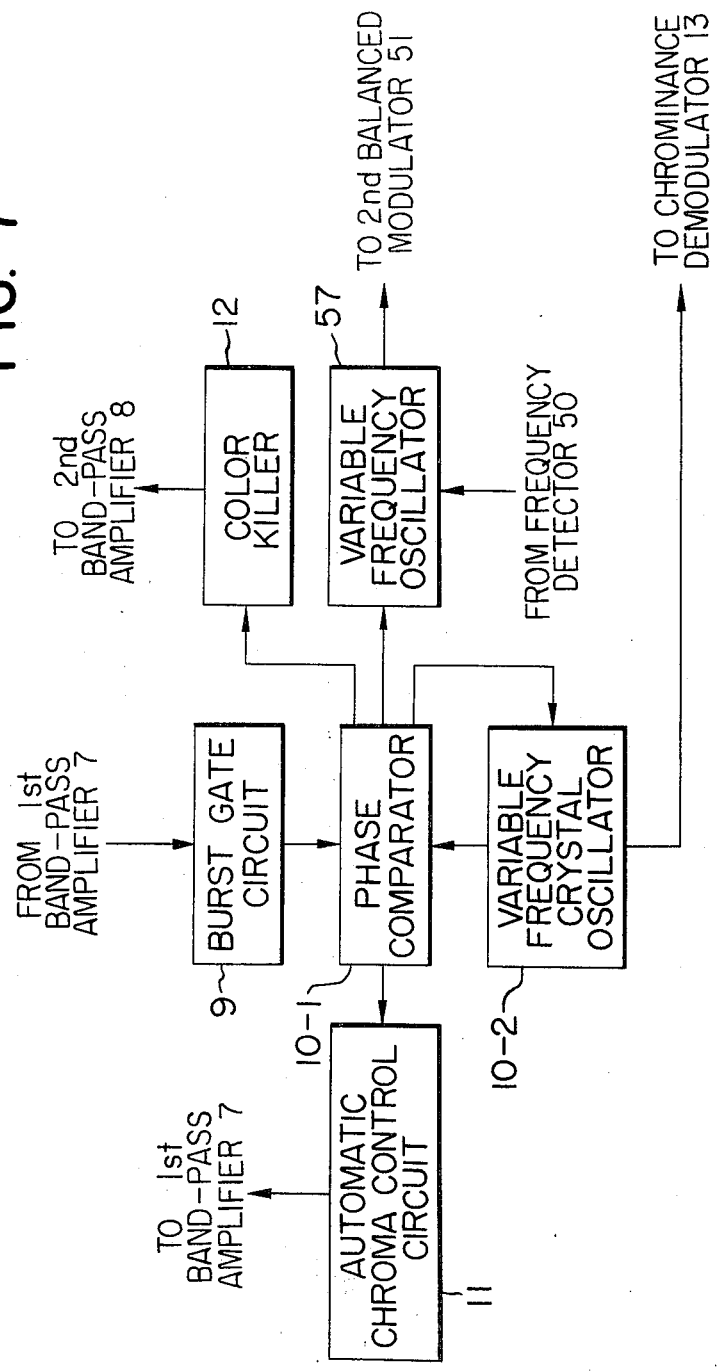

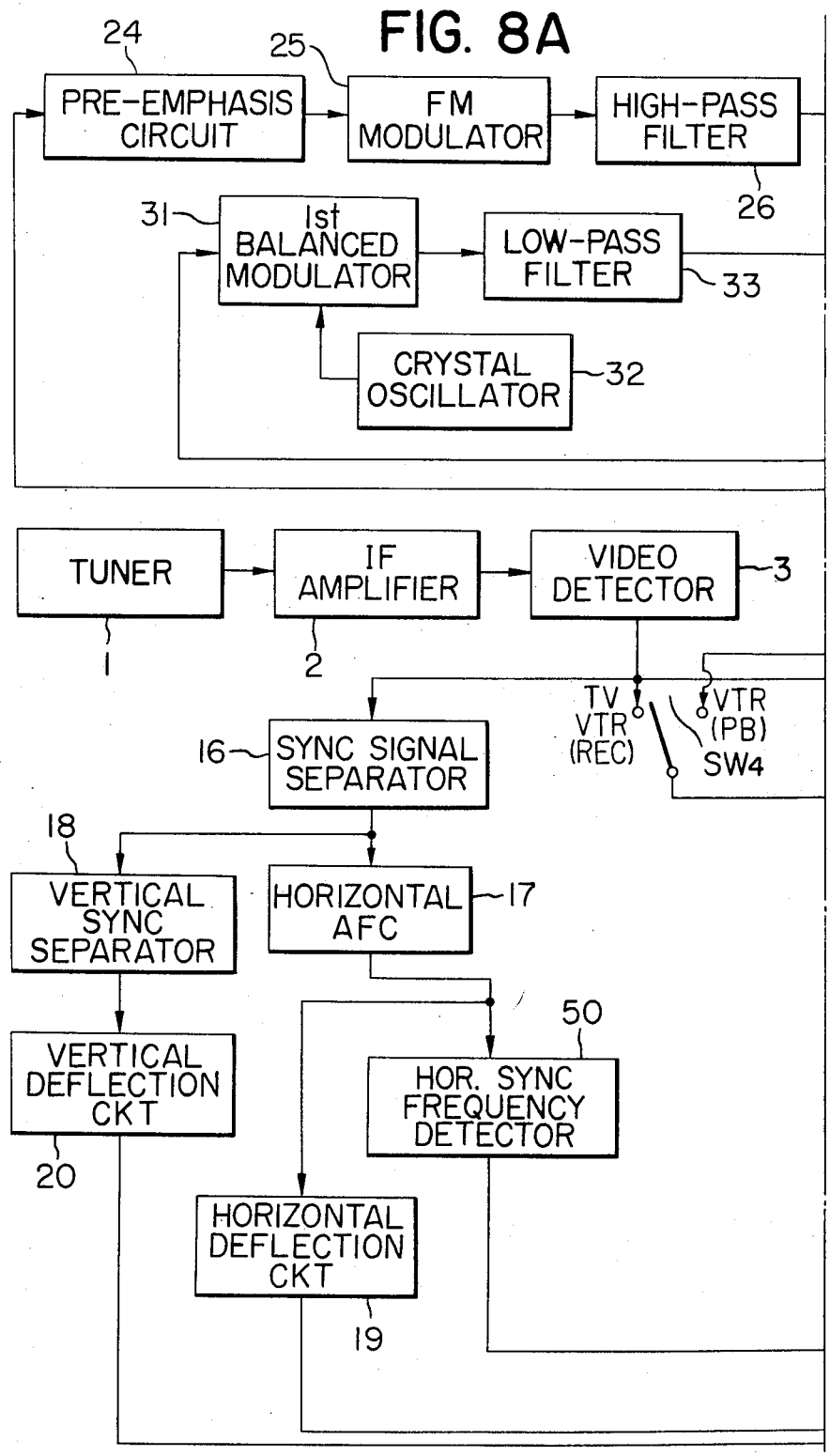

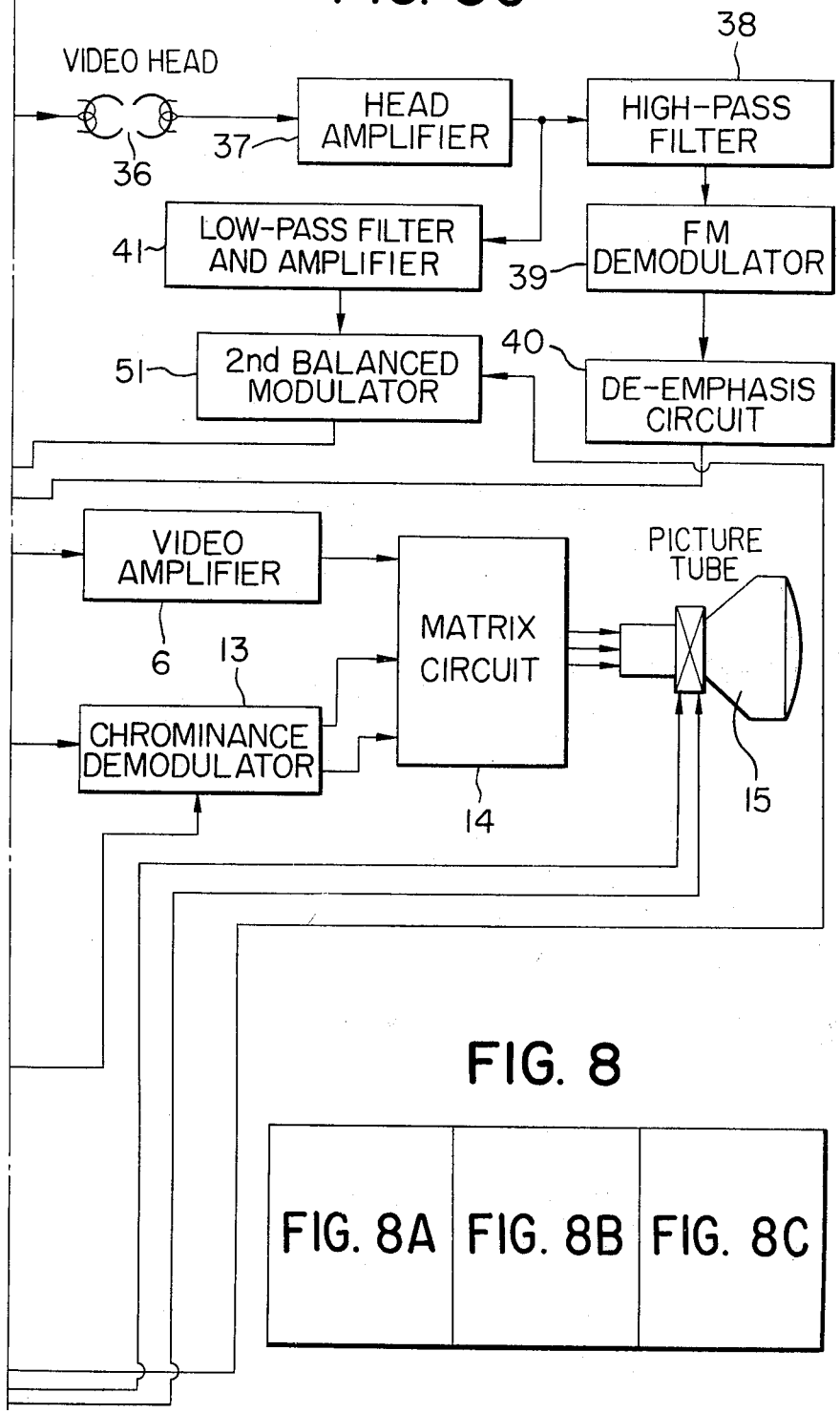

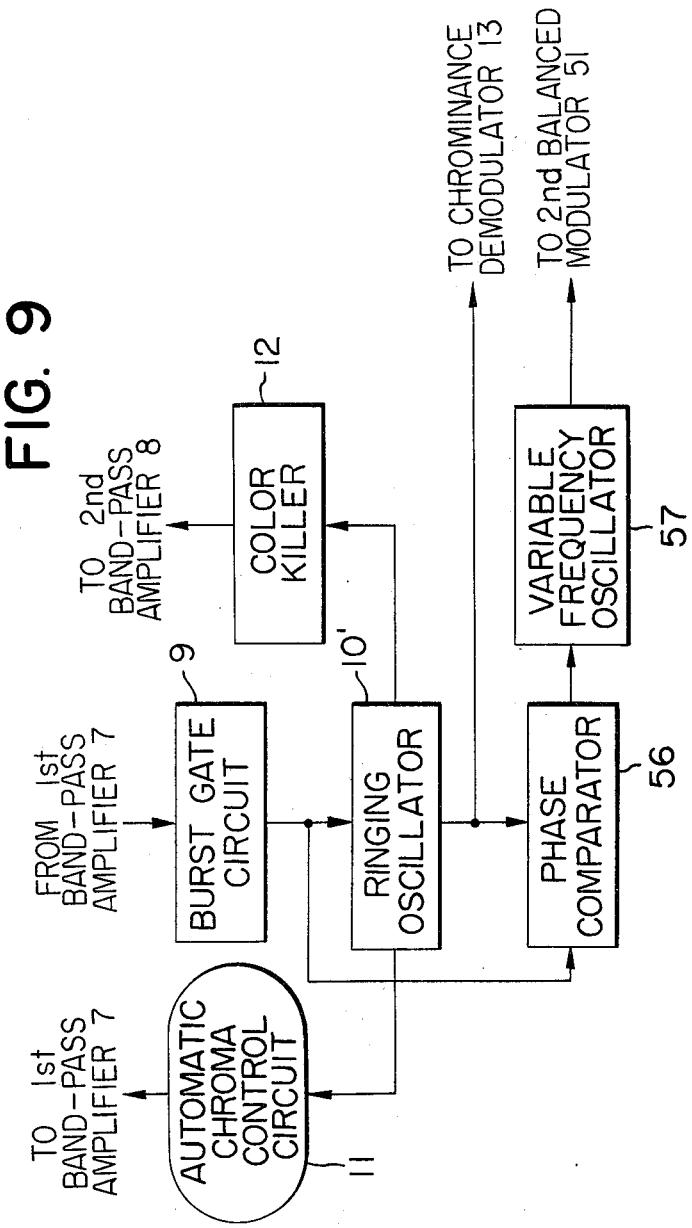

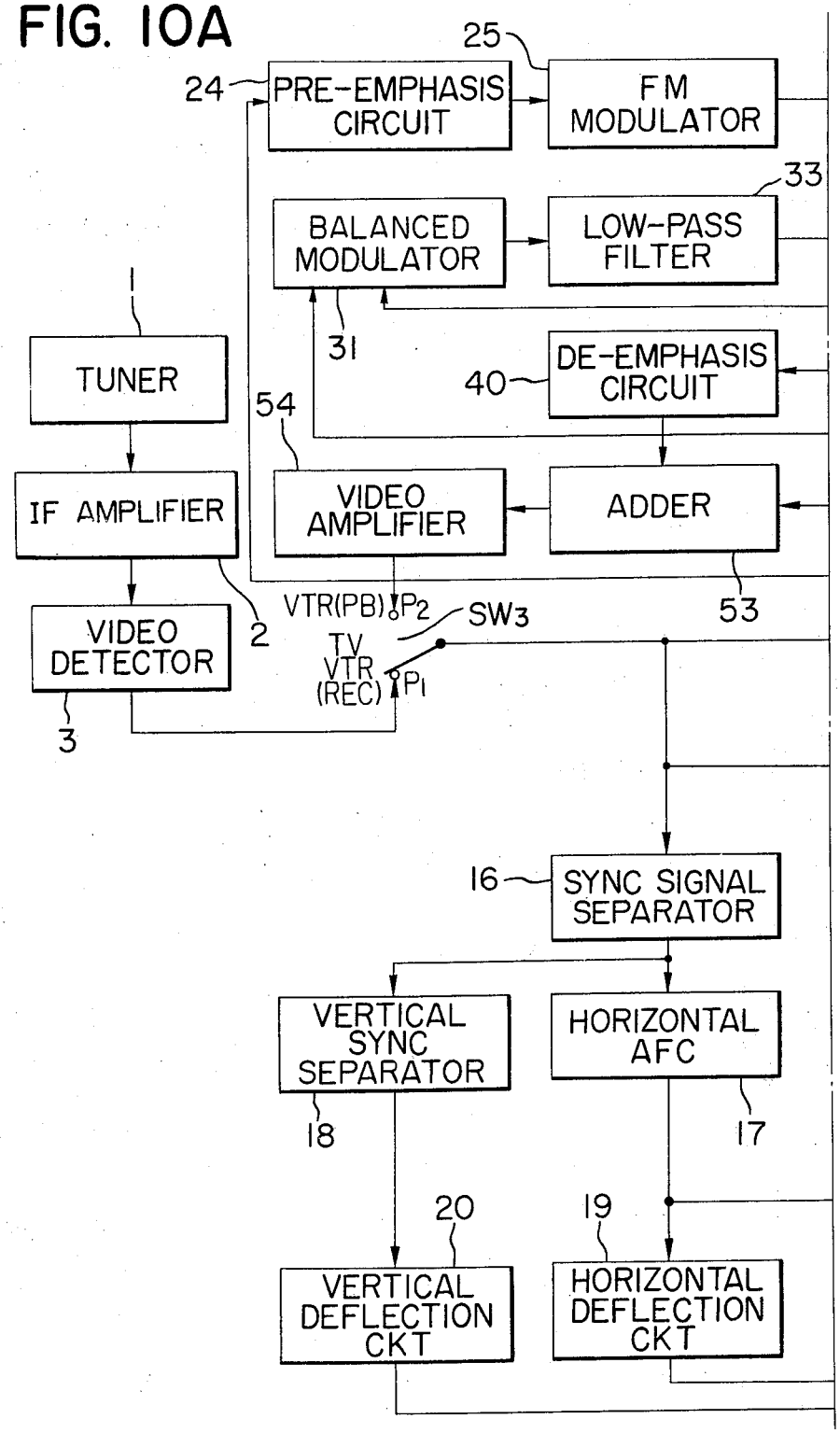

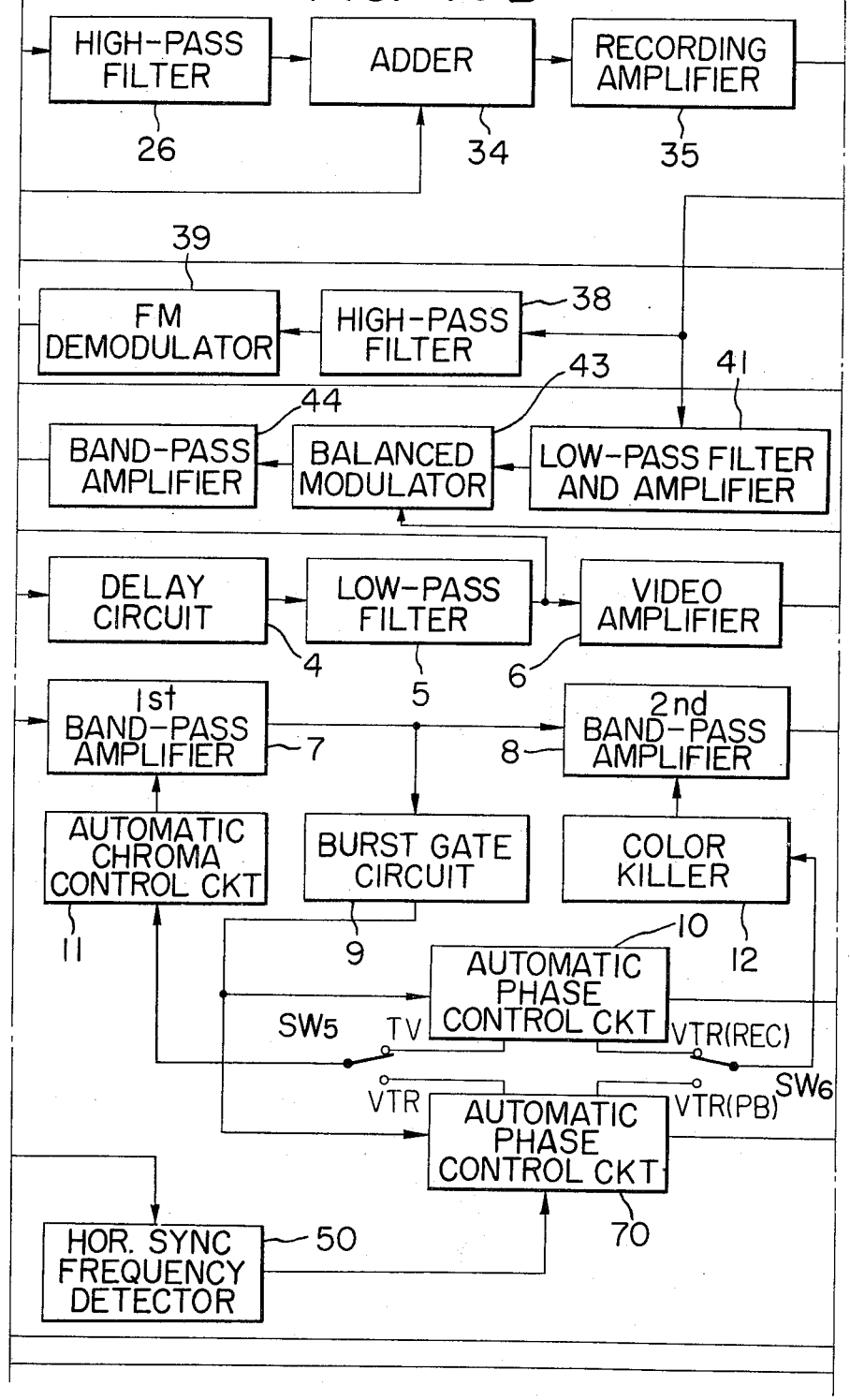

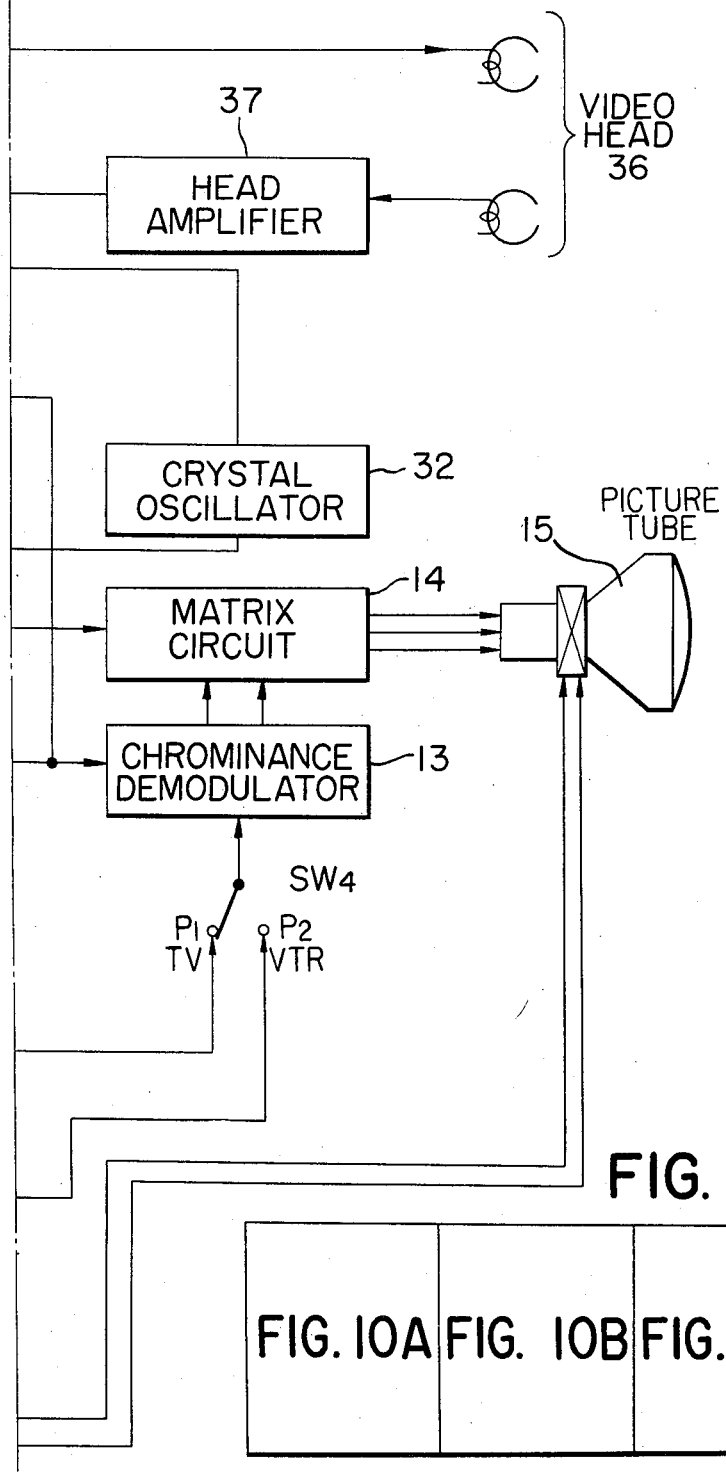

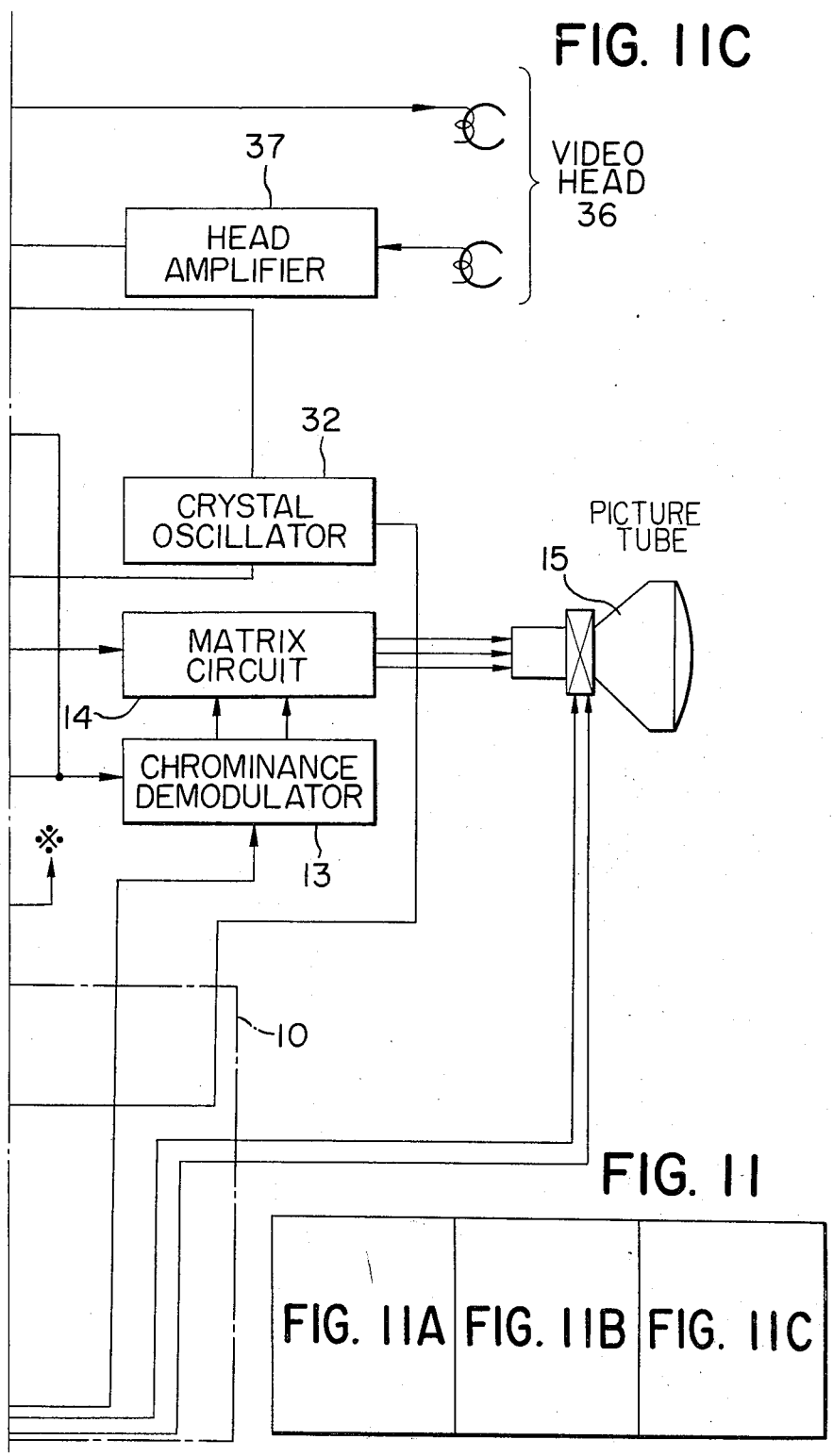

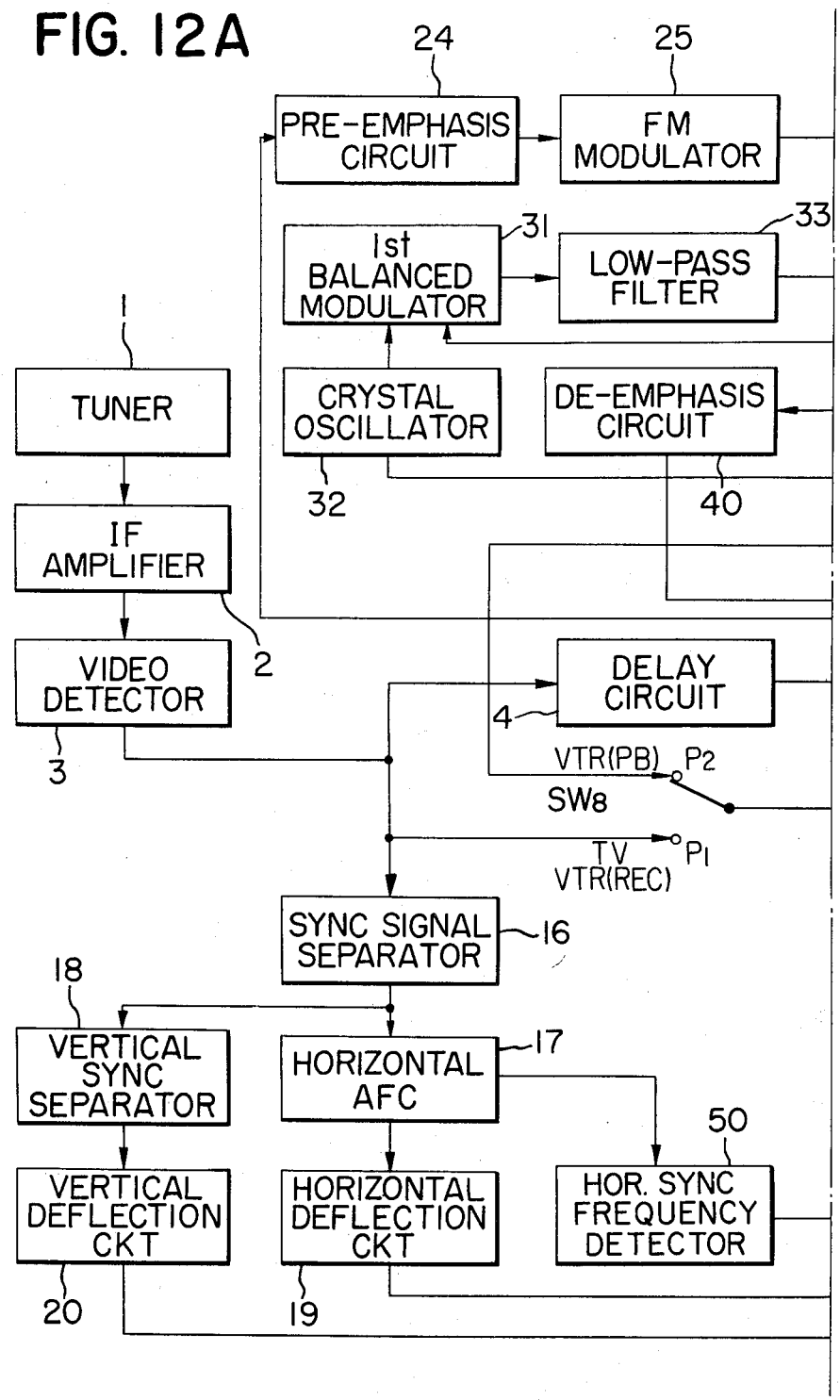

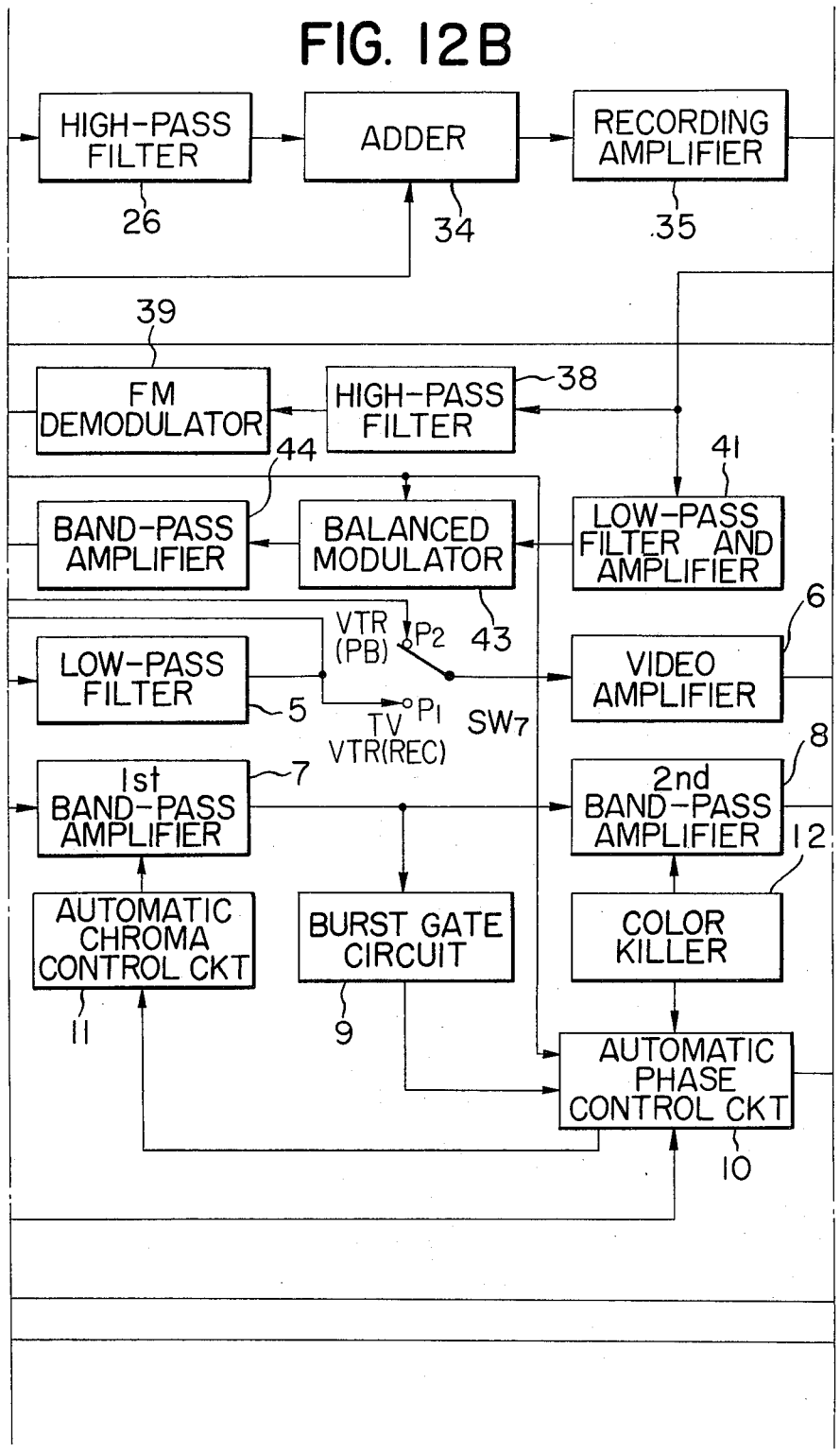

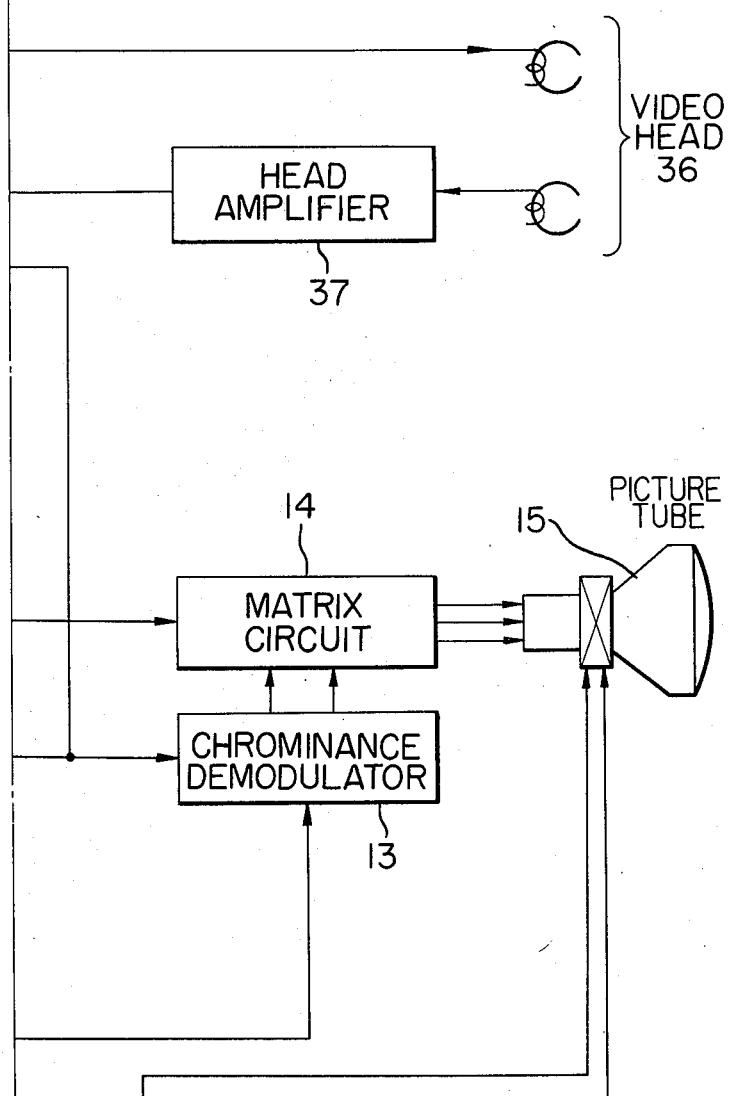

EQUIPMENT FOR RECORDING AND REPRODUCING COLOR TELEVISION SIGNAL

BACKGROUND OF THE INVENTION

The present invention relates to a color television signal recording-reproducing equipment in which a color television receiver and a magnetic color television signal recording-reproducing equipment to be referred to as a color VTR for brevity hereinafter in this specification are combined into a single unitary unit in such a way that some of the circuits may be used in common by both the VTR and the color television receiver.

The magnetic video tape recorders or VTRs have the advantages that the video information recorded upon a magnetic tape may be immediately played back or reproduced and that the recorded video information may be erased so that the new video information may be recorded again many times on the single video tape. However, the VTR must be used in conjunction with a television receiver or picture monitor. For this purpose, the VTR is electronically and mechanically coupled to a picture monitor or television receiver which is designed as a discrete equipment independently of the VTR.

The main reason why the home VTRs are not widely used is their expensive cost. That is, it is still a great burden to buy both a color television receiver and a VTR. Moreover the electronic and mechanical interconnection between the color television receiver and the VTR and their operation are very complex.

To overcome the above and other defects or problems, it has been proposed to combine a color television receiver with a VTR as a single unit, but the cost would be still prohibitive as they are designed and manufactured as a single unit respectively.

SUMMARY OF THE INVENTION

One of the objects of the present invention is therefore to provide a color television signal recording-reproducing equipment including a color television receiver as a monitor so that the operation may be much simplified.

Another particular object of the present invention is to provide a color television signal recording-reproducing equipment in which a color television receiver is combined with a color VTR as a single unit in such a way that some of their circuits may be used in common both by the television receiver and VTR so that the circuit arrangement may be remarkably simplified.

A further object of the present invention is to provide a color television signal recording-reproducing equipment in which, in the reproduction mode in which the pre-recorded color television innformation is reproduced, the stabilized operation of a color synchronizing circuit which is simple in arrangement may be ensured.

To attain the above and other objects, according to the present invention, a color television receiver is organically combined with a color VTR as a single unit so that their circuits are interconnected. As a result, in the VTR section may be eliminated a low-pass filter (LPF), an automatic gain control (AGC) circuit, a band-pass amplifier (BPA), a burst gate, an automatic chroma control (ACC) circuit, a sync separator, a crystal oscillator, an automatic phase control (APC) oscillator, and a buffer oscillator all of which must be included in the conventional color VTR. On one hand, the color television receiver section is only provided a few additional circuits including a recording-reproduction mode selection switch, a phase comparator and a variable frequency oscillator in an APC circuit, and an APC feedback loop.

In the recording mode, the luminance and chrominance signals derived in the receiver section are separately applied to the VTR. In order to record the color television signal transmitted from another color television signal source such as a television camera, the color television signal is applied through the mode selection switch to the input of the next stage of a video detector and then applied to the VTR. In either case, the color television signal may be recorded while one is monitored watching the picture on a picture tube.

In the reproduction or playback mode, the luminance and chrominance signals reproduced are added, and applied through the mode selection switch to the stage next to the video detector in the receiver section to be separated again into the luminance signal and the chrominance signal. The two signals are processed by the separate processing circuits, respectively, so that the picture may be reproduced on the picture tube. Therefore, according to the present invention the circuit arrangement is considerably simplified and the phase distortion problem may be completely eliminated.

The novel features of the present invention may be summarized as follows:

1. The circuit arrangement is much simplified so that the production may be facilitated.
2. Therefore inexpensive color television signal recording-reproducing equipment may be provided.
3. The setting or the mechanical electrical, annd electronic interconnection between the conventional color television receiver and VTR may be completely eliminated so that the operation may be greatly facilitated.
4. The operation is so simple that even a layman can operate the equipment in a simple and safe manner.
5. The circuit arrangement may be further simplified when the luminance signal and the chrominance signal are separately applied from the VTR section to the receiver section.
6. The feedback loop is provided in conjunction with the color synchronization circuit so that the operation of the latter may be much stabilized. Therefore the effects caused by the jitter in the VTR section may be minimized.
7. When a ring type APC circuit is employed, the overall circuit arrangement of the equipment may be further simplified. Moreover the operation of the APC circuits and the color killer may be stabilized.
8. The television signal transmitted not only from a television station but from a television camera may be recorded and reproduced in a simple manner while one monitors on a picture tube without providing any other picture monitors.
9. When used in conjunction with a handy television camera incorporating a small-sized transmitter, the equipment of the present invention may be used as a wireless monitor which also functions as a VTR.

The above and other objects, features and advantages of the present invention will become more apparent from the following description of the preferred embodiments thereof taken in conjunction with the accompanying drawings.

BRIEF DESCRIPTION OF THE DRAWING

FIGS. 1A and 1B are block diagrams of a conventional color television receiver;

FIGS. 2A, 2B and 2C are block diagrams of a conventional color VTR, standard type-1 VTR of Electronic Industries Association of Japan;

FIGS. 4A, 4B and 4C are block diagrams of a first embodiment of a color television signal recording-reproducing equipment in accordance with the present invention;

FIGS. 6 and 7 are block diagrams of first and second variations or modifications, respectively, of a section indicated generally by the reference character A in FIG. 4;

FIGS. 8A–8C and 9 are block diagrams of first and second variations or modifications of the first embodiment shown in FIG. 4;

FIGS. 10A–10C is a block diagram of a second embodiment of the present invention;

FIGS. 11A–11C is a block diagram of a first variation or modification of the second embodiment shown in FIG. 10;

FIG. 12A–12C is a block diagram of a third embodiment of the present invention.

DESCRIPTION OF THE PREFERRED EMBODIMENTS

Prior Art, FIGS. 1A, 1B, 2A, 2B, 2C and 3

Prior to the description of the preferred embodiments of the present invention, the prior art color television receiver as well as the color VTR will be described briefly with reference to FIGS. 1, 2, and 3 in order to specifically point out the problems thereof.

Figure 1B:
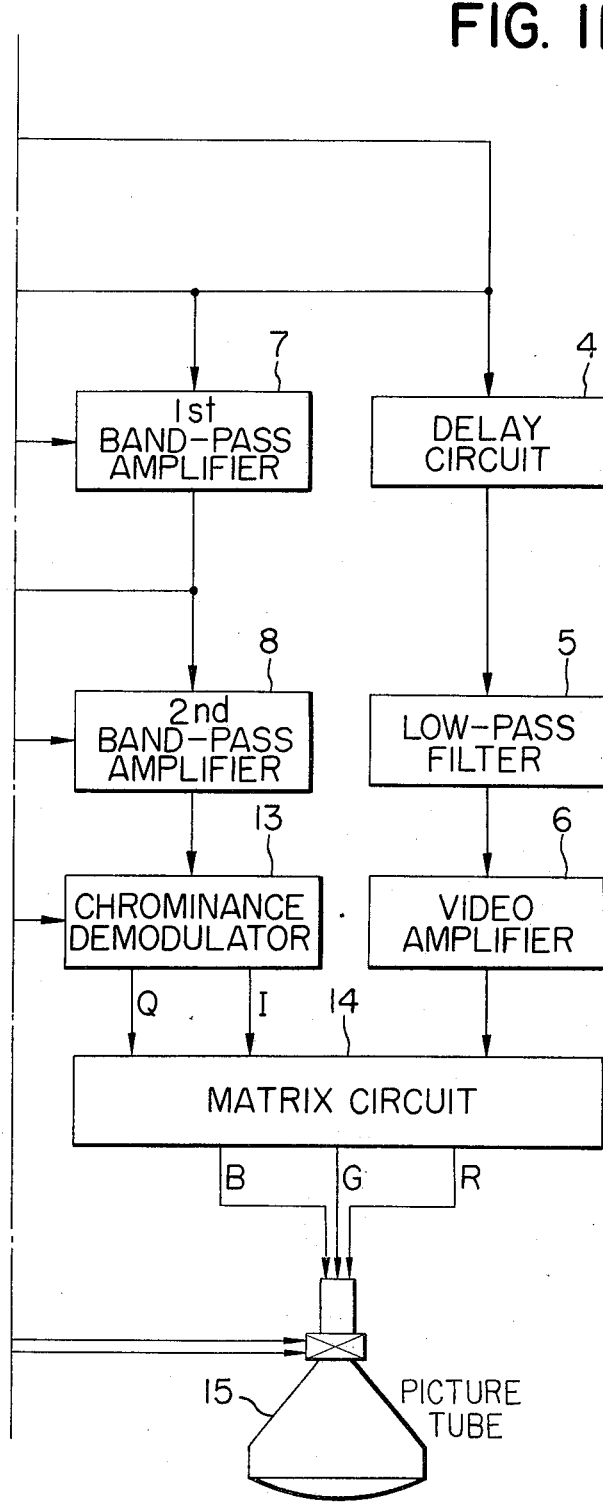
Figure 2B:
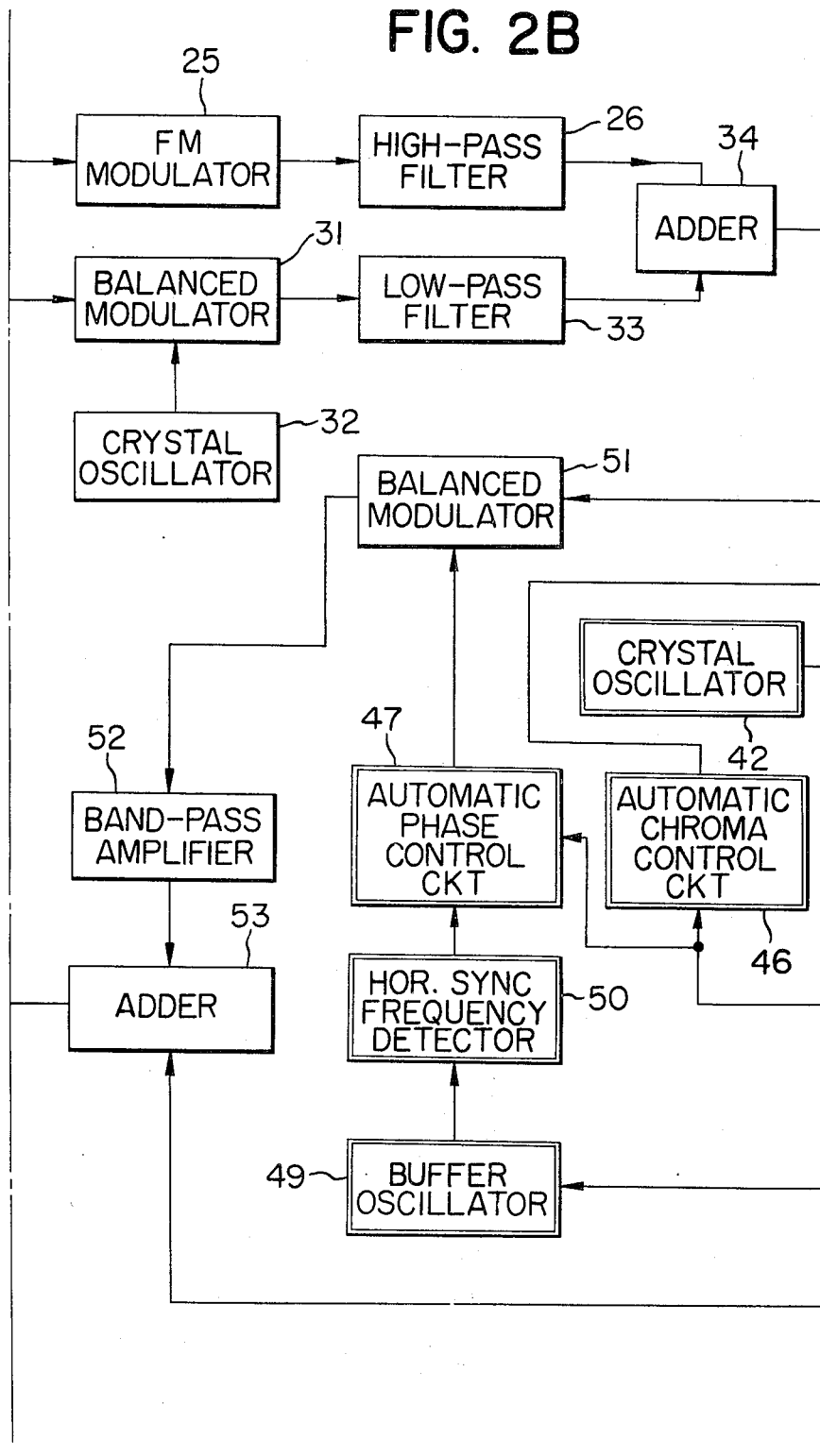
Figure 3:
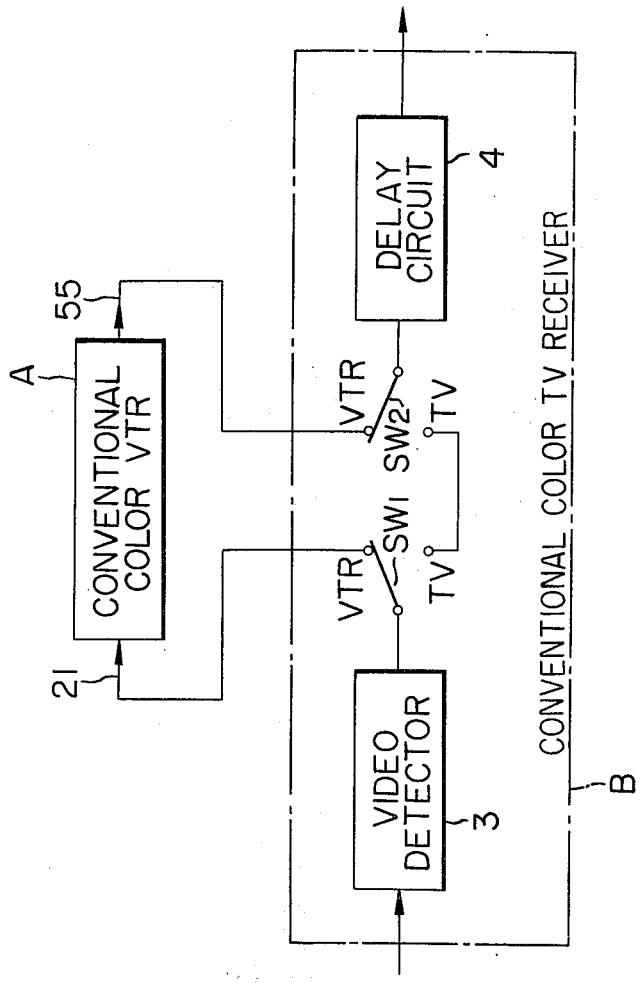
FIG. 3 is a block diagram used for the explanation of the combination of the television receiver shown in FIGS. 1A and 1B with the color VTR shown in FIGS. 2A and 2B.

In general the color television receiver shown in block diagrams in FIGS. 1A and 1B are combined as shown in FIG. 3 with the color VTR as shown in block diagrams in FIGS. 2A and 2B so that the television signal received by the color television receiver may be recorded and reproduced by the color VTR. However the color television receiver and the color VTR are designed as discrete units respectively, so that some circuits as shown in the double-lined blocks in FIGS. 2A and 2B are used in both the television receiver and VTR. This is the main reason why the cost of the color television VTRs cannot be reduced.

Referring to FIGS. 1A and 1B, reference numeral 1 denotes a tuner; 2, an intermediate frequency (IF) amplifier with an AGC so as to maintain the received TV signal constant; and 3, a video detector the output of which is applied to a delay circuit 4 for delaying the luminance signal, and to a first bandpass amplifier 7 to be referred to as "1st BPA" hereinafter in this specification, and also to a sync separator 16. The output of the delay circuit 4 is applied to a low-pass filter LPE 5 so that the component of the carrier chrominance signal may be removed. The output of the low-pass filter 5 is applied to a video amplifier 6, and the amplified luminance signal is applied to a matrix circuit 14. The output of the 1st PBA is applied to a burst gate circuit 9 so that the color burst signal derived hereby is applied to an APC circuit 10. The control signal which is derived by the phase detection of the burst signal is applied through an ACC loop 11 to the last BPA 7 so that the gain of the latter may be maintained constant. In response to the output of a color killer circuit 12, which detects whether the burst signal is present or not, a second band-pass amplifier BPA 8 is controlled. That is, when the burst signal is not present, the 2nd BPA 8 is cut off. The output of the 2nd BPA 8 is synchronously-detected by a chroma demodulator 13 into the I and Q signals, which in turn are applied to the matrix circuit 14. The output R, G, and B signals of the matrix circuit 14 are applied to a picture tube 15. The sync signal derived by the sync separator 16 is applied not only to a horizontal deflection circuit 19 through a horizontal AFC 17, but also to a vertical deflection circuit 20 through a vertical sync signal separator 18.

Next referring to FIGS. 2A, 2B and 2C illustrating the color television VTR used in conjunction with the color television receiver of the type described above the reference to FIGS. 1A and 1B, reference numeral 21 denotes a video signal input terminal; 22, a low-pass filter for separating the luminance signal; 23, AGC circuit for maintaining the level of the luminance signal constant; 24, a pre-emphasis circuit; 25, an FM modulator; 26, a high-pass filter for removing a part of the lower sideband of the frequency-modulated luminance signal; 27, a band-pass amplifier for removing the carrier chrominance signal; 28, a burst gate; 29, an ACC loop for maintaining the gain of the BPA 27 constant, thereby maintaining the level of the burst signal constant; 30, a sync separator which derives the horizontal sync signal in response to which the burst signal is gated; 31, a balanced demodulator which, in cooperation with a low-pass filter 33, derives the carrier chrominance signal which has the frequency difference between the output of the band-pass smplifier 27 and the output frequency $f_1$ (for instance, 4, 3 MHz) from a crystal oscillator 32; 34, an adder for summing up the FM signal to the modulated low frequency chrominance signal; 35, a recording amplifier; 36, a video head; 37, a head amplifier; 38, a high-pass filter for separating the reproduced FM signal; 39, an FM demodulator; 40, a de-emphasis circuit; 41, a low-pass filter and amplifier for separating the reproduced carrier chrominance signal; 42, a crystal oscillator of chrominance subcarrier frequency of 3.58 MHz; 43, a balanced modulator which cooperates with a band-pass amplifier 44 in the next stage to reinsert the subcarrier from the crystal oscillator 42 into the output of the LPF and amplifier 41 to derive the carrier chrominance signal; 45, a burst gate which gates the burst signal in the carrier chrominance signal from the band-pass amplifier 44 to apply it to an ACC loop 46 and an APC circuit 47 so that the gain of the amplifier 41 may be controlled to maintain the level of the carrier chrominance signal constant; 48, a sync separator which also functions as a waveshaping circuit; 49, a buffer oscillator which is driven in response to the horizontal sync signal; 50, a horizontal sync frequency detector for detecting the frequency of the reproduced horizontal sync signal, the oscillation frequency of a variable frequency oscillator in the APC circuit being controlled in response to the output of the frequency detector 50; 51, a balanced modulator which balance-modulates the output from the LPF and amplifier 41 with the output (cw signnal locked in phase with the burst signal) from the APC oscillator 47; 52, a band-pass amplifier which derives the carrier chrominance signal of 3.58 MHz with the jitter removed; 53, an adder which adds the output from the band-pass amplifier 52 with the output from the de-emphasis circuit 40; and 54, an amplifier for amplifying the output of the adder 53, the amplified NTSC signal appearing at an output terminal 55. The jitter is removed from the reproduced NTSC signal so that colors may be reproduced on the picture tube in a stable manner.

Next referring to FIG. 3, A denotes the color VTR of the type described above with reference to FIGS. 2A, 2B and 2C; and B, the color television receiver described with reference to FIGS. 1A and 1B. Selection switches $SW_1$ and $SW_2$ are placed between the video detector 3 and the delay circuit 4 in the color television receiver. In recording mode, the output from the video detector 3 is applied through a switch $SW_1$ to the input terminal 21 of the VTR while the output terminal 55 of the VTR is connected to a switch $SW_2$. When the video signal is not recorded, both the switches $SW_1$ and $SW_2$ are switched to close the contacts TV. As explained hereinbefore, the color television receiver and VTR, which are designed as an individual unit, must be connected as shown in FIG. 3 so that the cost cannot be reduced.

The Present Invention

First Embodiment, FIGS. 4 through 9

According to the present invention, a color television receiver and a color VTR are combined as a unit in such a manner that some of their circuits may be used in common, whereupon the cost may be reduced, the operation may be made very simple, and the stable picture reproduction may be ensured.

Figure 4B:
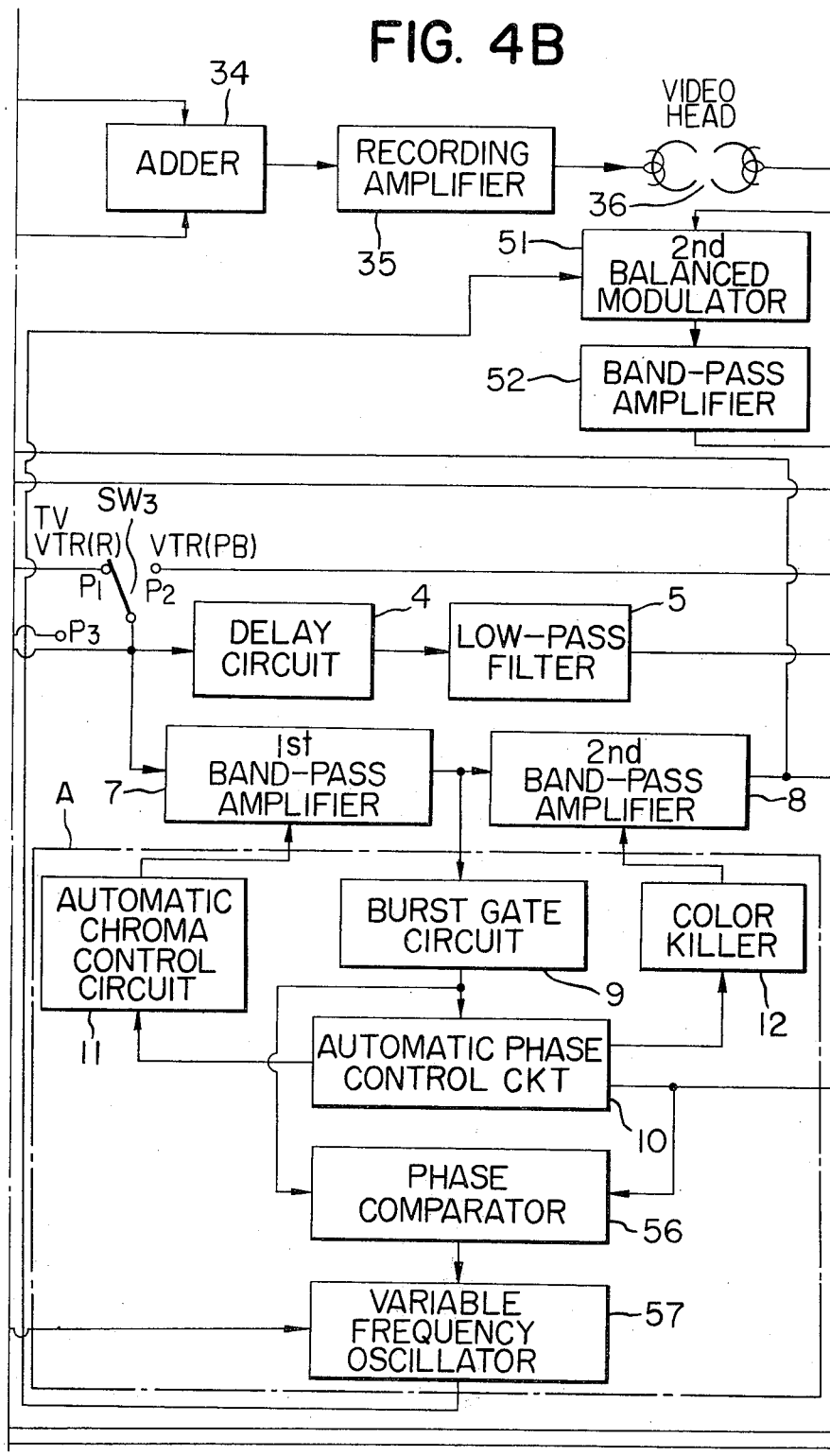

Referring to FIGS. 4A, 4B and 4C illustrating the first fundamental embodiment of the present invention, a switch $SW_3$ is switched to close the contact TV $P_1$ when the TV signal of the desired channel is received, but is not recorded. The TV reception is not affected at all by the activation or de-activation of the circuits 50, 56 and 57 added in the color television receiver.

In recording, the switch $SW_3$ classes the contact $P_1$ so that the luminance signal, which is derived by the delay line 4 and the low-pass filter 5, may be applied to the preemphasis circuit 24 in the VTR section. Alternatively, the luminance signal may be derived from the video amplifier 6. The output from the pre-emphasis circuit 24 is frequency-modulated by the FM modulator 25.

The chrominance signal is derived by the 1st and 2nd BPAs 7 and 8, the ACC circuit 11 and the killer circuit 12, and applied to the first balanced modulator 31 in the VTR section. The balanced modulator 31 modulates the output of the 2nd bandpass amplifier 8 with the output $f_1$ (for instance 4.3 MHz) of the stable crystal oscillator 32, and the output from the modulator 31, that is the difference signal between the outputs of the 2nd band-pass amplifier 8 and crystal oscillator 32, is derived by the low-pass filter 33 and added by the adder 34 with the frequency-modulated luminance signal to be recorded upon a magnetic video tape. In recording mode, the television signal which has not passed through the VTR may be monitored on the picture tube 15.

In reproduction or playback, the output from the video head 36 is amplified by the head amplifier 37, the frequency-modulated wave is removed by the high-pass filter 38, and the luminance signal is reproduced by the FM demodulator 39. Meanwhile the output of the head amplifier 37 passes through the low-pass filter 41 so that the low frequency modulating chrominance signal is separated and then applied to the balanced modulator 51. The balanced modulator 51 modulates the output of the low-pass filter 41 with the output from a variable frequency oscillator 57 centered at $f_1$ so that the NTSC carrier chrominance signal of 3.58MHz, which is the difference between the output from the variable frequency oscillator 57 and the output from the low-pass filter 41, may be derived. When the frequency of the oscillator 32 is selected lower than 3.58 MHz, the output of the balanced modulator 51 is the carrier chrominance signal whose frequency is the sum of the frequency of the output from the low-pass filter 41 and the frequency of the variable frequency oscillator 57. The carrier chrominance signal (that is, the output of the band-pass amplifier 52) is added in the adder 53 to the reproduced luminance signal, and the output of the adder 53 appears at the contact $P_2$ of the switch $SW_3$. In reproduction mode, the switch $SW_2$ is switched to close the contact $P_2$ so that the reproduced signal from the VTR is applied to the luminance signal circuit, the chrominance signal circuit, and the sync separator 16. The carrier chrominance signal is processed in the manner described hereinbefore through the band-pass amplifiers 7 and 8, the burst gate 9, the APC circuit 10, the ACC circuit 11, the killer 12, the chroma demodulator 13 and the matrix circuit 14 so that the picture is reproduced upon the picture tube 15. A phase comparator 56 compares the phase of the output from the APC circuit 10 with that of the burst signal from the burst gate 9 so that in response to the output or the difference signal from the phase comparator the frequency as well as the phase of a variable frequency oscillator 57 may be controlled.

In general the output from the VTR includes the jitter whose instantaneous phase variation is considerably greater than the phase pull-in range of the APC circuit in the television receiver. As a result the picture cannot be reproduced in correct color. In some case, the killer 12 is activated so that the reproduced picture has no color.

However, in the arrangement shown in FIGS. 4A, 4B and 4C, the phase comparator 56 compares the phase of the burst gate from the burst gate 9 with the phase of the output of 3.58MHz from the crystal oscillator so that the frequency as well as the phase of the output of the variable frequency oscillator 57 may be automatically controlled in response to the output from the phase comparator. The carrier chrominance signal of the frequency which is the difference between those of the output from the variable frequency oscillator 57 and LPF 41, is derived from the band-pass amplifier 52, and applied through the adder 53, and the band-pass amplifier 7 to the burst gate 9. That is, the loop consisting of the circuits 41, 51, 52, 53, 7, 9, 10, 56, 57, and 51 so functions that the output of the phase comparator 56 may be maintained zero. As a result, the frequency of the output of the band-pass amplifier 7 always coincides with the frequency of the output from the crystal oscillator in the APC circuit. Moreover the output from the band-pass amplifier 7 may maintain a predetermined phase relationship with the output of the crystal oscillator.

Therefore the stable operation of the APC circuit 10 may be ensured so that the stable synchronous detection of the chrominance signal may be also ensured. Moreover the operations of the ACC circuit and killer circuit may be also improved. The output of the horizontal automatic frequency control 17 is frequency-detected by the frequency detector 50 to control the center frequency of the output from the variable frequency oscillator 57. As a result the phase pull-in range of the above control loop consisting of 41 through 51 may be increased and stabilized.

When the color television receiver and VTR are combined into a unit in accordance with the present invention in the manner described hereinabove, various advantages may be obtained. Firstly, in the VTR of the type shown in FIGS. 2A and 2B, the low-pass filter 22, the AGC circuit 23, the band-pass amplifier 27, the burst gate 28, the ACC circuit 29, the sync separator 30, the crystal oscillator 42, the band-pass amplifier 44, the burst gate 45, the ACC circuit 46, the APC oscillator 47, the sync separator 48, and the buffer oscillator 49, all shown in the double-lined blocks, may be eliminated while only two additional circuits such as the phase comparator 56 and the variable frequency oscillator 57 are placed in the color television receiver. Thus the cost may be considerably reduced while the operation may be much improved and simplified.

Figure 5:
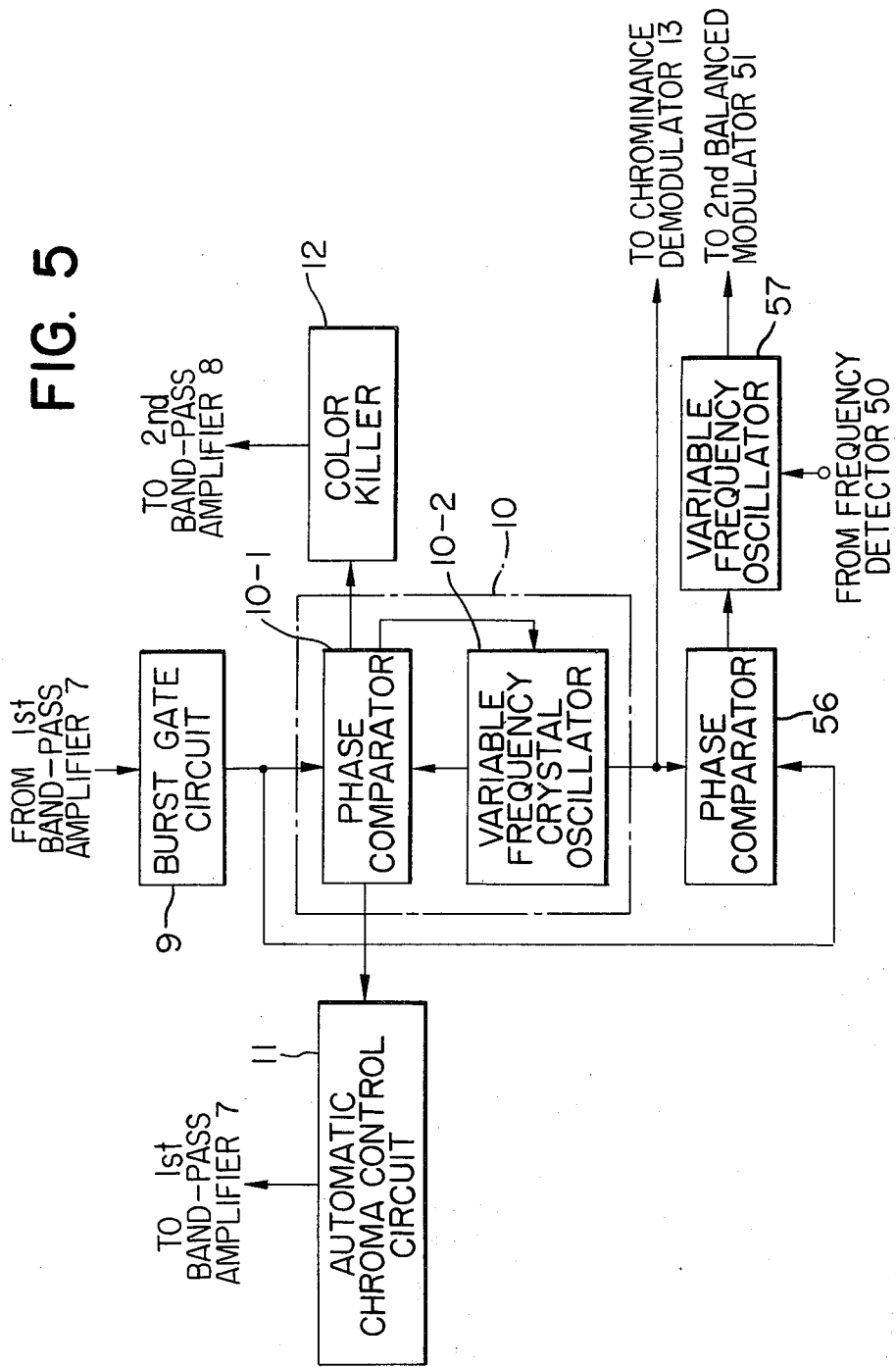
FIG. 5 is a detailed block diagram of a section indicated by the reference character A in FIG. 4.

Next referring to FIG. 5, the circuits in the chainline block A shown in FIG. 4B will be described in detail hereinafter. The output burst signal from the burst gate 9 is compared by a phase comparator 10-1 with the output signal from a crystal variable frequency oscillator 10-2 so that the phase of the output from the latter 10-2 may be controlled in response to the output of the phase comparator 10-1. In like manner the phase comparator 56 compares the phase of the output from the burst gate 9 with the phase of the output from the crystal variable frequency oscillator 10-2 so that the phase of the output of the variable frequency oscillator 57 may be controlled in response to the output of the comparator 56. Thus the control is made such a way that the output voltages from the phase comparators 10-1 and 56 may become zero.

Figure 6:
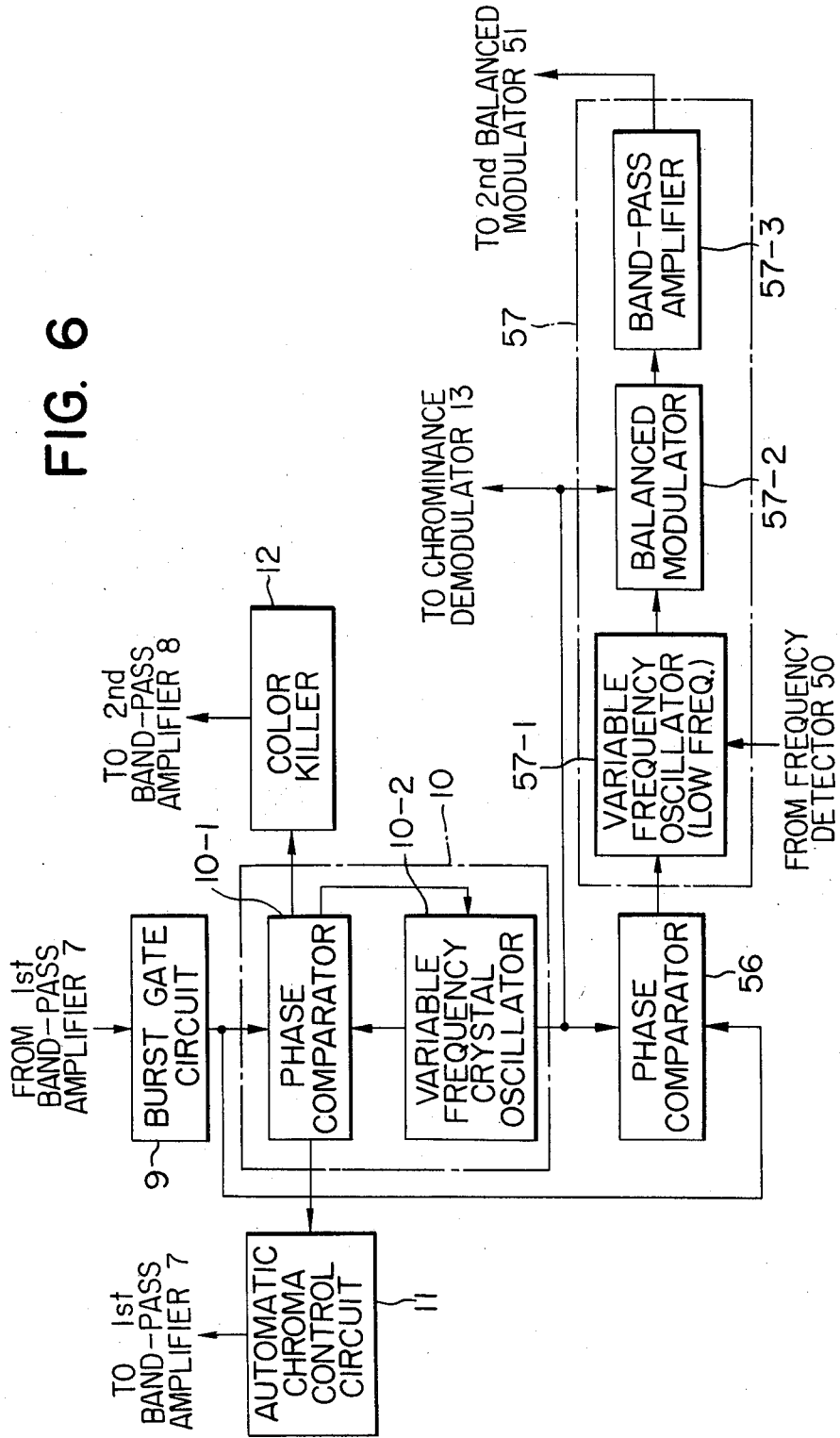

Next referring to FIG. 6, the first variation of the block A will be described hereinafter. The free-running frequency of the variable frequency oscillator 57 may be stabilized by the first variation. That is, the crystal oscillator 10-2 with an oscillation frequency of 3.58 MHz is combined with a variable frequency oscillator 57-1 with a lower oscillation frequency to derive the frequency which is the sum of the frequencies of the outputs from both oscillators 10-2 and 57-1, whereupon the stabilization of the free-running frequency may be ensured. More particularly, this sum frequency is substantially equal to the frequency of the variable frequency oscillator 57 shown in FIG. 5 (that is the crystal oscillator 32 in FIG. 4B). The outputs of the variable frequency oscillators 57-1 and 10-2 are balance-modulated by a balanced modulator 57-2, and then the sum frequency is derived through a band-pass amplifier 57-3.

Next referring to FIG. 7, the second variation or modification of the block A will be described. In the second variation, the phase comparator 56 is eliminated, and the variable frequency oscillator 57 is controlled only in response to the output from the single phase comparator 10-1. In general the output signal from the VTR includes the jitter with high amplitudes and frequencies so that the response of the phase comparator in the VTR must be faster than that of the phase comparator in the television receiver. However according to the second variation the phase comparator 10-1 may be so designed as to satisfy the demands from both the television receiver and VTR.

In addition to the above variations, many variations may be effected. For instance when two phase comparators are used, a phase splitter may be used in common. When only one phase comparator is used, a phase locking-in circuit may be additionally inserted.

Figure 8B:
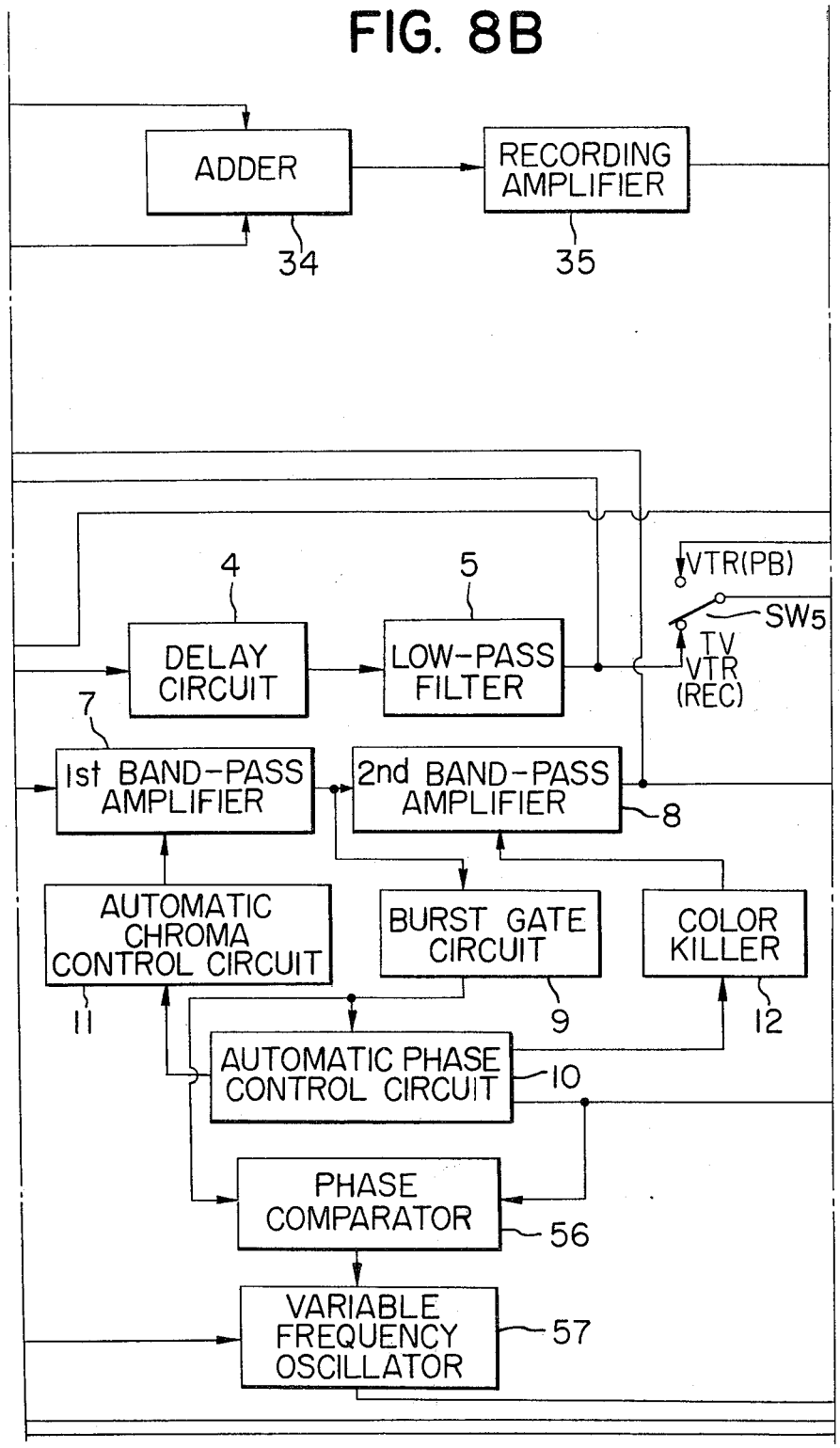

Two Modifications of First Embodiment, FIGS. 8 and 9

The important feature of the first and second modification to be described hereinafter with reference to FIGS. 8 and 9, is that unlike the first embodiment, the luminance signal and the carrier chrominance signal from the VTR are separately fed into the color television receiver. For this purpose, the first modification requires an additional switch, but has a distinct advantages (1) that the band-pass amplifier 52 as well as the adder 53 (See FIG. 4C) may be eliminated, (2) that the luminance signal is not combined with the chrominance signal so that the response frequency of the luminance signal is not necessarily limited to 3.0 MHz, but is increased; and (3) that even though the killer circuit in the VTR is not actuated in response to the killer circuit 12 in the television receiver circuit in the first embodiment, the killer circuit in the second embodiment may be used in common both in the television receiver and VTR.

So far the present invention has been described as being applied to the color television receiver of the type in which an APC circuit is used as a subcarrier oscillator, but it can be also used a ringing oscillator as a subcarrier oscillator. A variation shown in FIG. 9 of the modifications as shown in FIGS. 5 through 8 is substantially similar in construction to the latter except that a ringing oscillator 10' including a crystal filter is used as a subcarrier oscillator.

In summary, according to the first fundamental embodiment and its variations described, a color television receiver and a color VTR may be combined as a unit so that the stabilized operations of the APC circuit and the killer circuit may be ensured.

Second Embodiment, FIGS. 10, 11, 13, 14, and 15

The second fundamental embodiment of the present invention shown in block diagram in FIG. 10 is substantially similar in construction to the first embodiment shown in FIG. 4 except (1) that the AGC circuit in the VTR may be eliminated because the video IF amplifier 2 includes an AGC circuit even though the output of the low-pass filter 5 in the color television receiver is directly coupled to the pre-emphasis circuit 24 in the VTR; (2) that the band-pass amplifier as well as the ACC circuit in the VTR may be eliminated because the output of the second band-pass amplifier 8 is applied to the balanced modulator 31; (3) that in the reproduction circuit of the VTR the reproduced chrominance signal (that is the output of the low-pass filter 41) is modulated in the balanced modulator by the output of 4.3 MHz of the crystal oscillator 32 (which is also used in common with the recording circuit) so that the carrier chrominance signal of 3.58 MHz containing the jitter may be derived from the band-pass amplifier 44, added with the luminance signal, amplified and derived from the switch SW$_3$; and (4) that the color television receivers includes the additional switches SW$_3$, SW$_4$, SW$_5$ and SW$_6$ and two APC circuits.

In recording mode as well as reception mode, all of the switches SW$_3$ through SW$_6$ are switched to close the TV contacts while in the reproduction mode, they are switched to close the VTR contacts.

The first automatic phase control circuit (APC-1) is of the type used in the conventional color television receiver (and may be a ringing oscillator type driven in response to the burst signal), and is activated to function in a manner substantially similar to that in the conventional color television receiver when the switches SW$_3$ through SW$_6$ are switched to close the TV contacts in the recording and reception mode. In the reproduction mode, the output of the VTR is applied through the switch SW$_3$ to the color television receiver, and the switches SW$_5$ and SW$_6$ connects the second APC circuit 70 with the ACC circuit 11 and the killer 12. The reason why the second APC circuit 70 is included in the second embodiment will be described. In general the output from the VTR includes the jitter with about 1% P—P so that the reproduced chrominance signal is of the order of ± 4 KHz. The pull-in range of the conventional APC circuit comprising a crystal variable frequency oscillator is of the order of 1 KHz at the most. Therefore the APC circuit cannot oscillate in synchronism with the reproduced chrominance signal. Therefore the second APC circuit including an LC-oscillator of the type used in the VTR in reproduction mode is provided in order to detect the carrier chrominance signal. Furthermore the output from the AFC circuit 17 is detected by the FM detector 50 so as to control the oscillation frequency of the variable frequency oscillator in the second APC circuit 70. Therefore the buffer oscillator 49 shown in FIG. 2 may be eliminated.

Figure 11A:
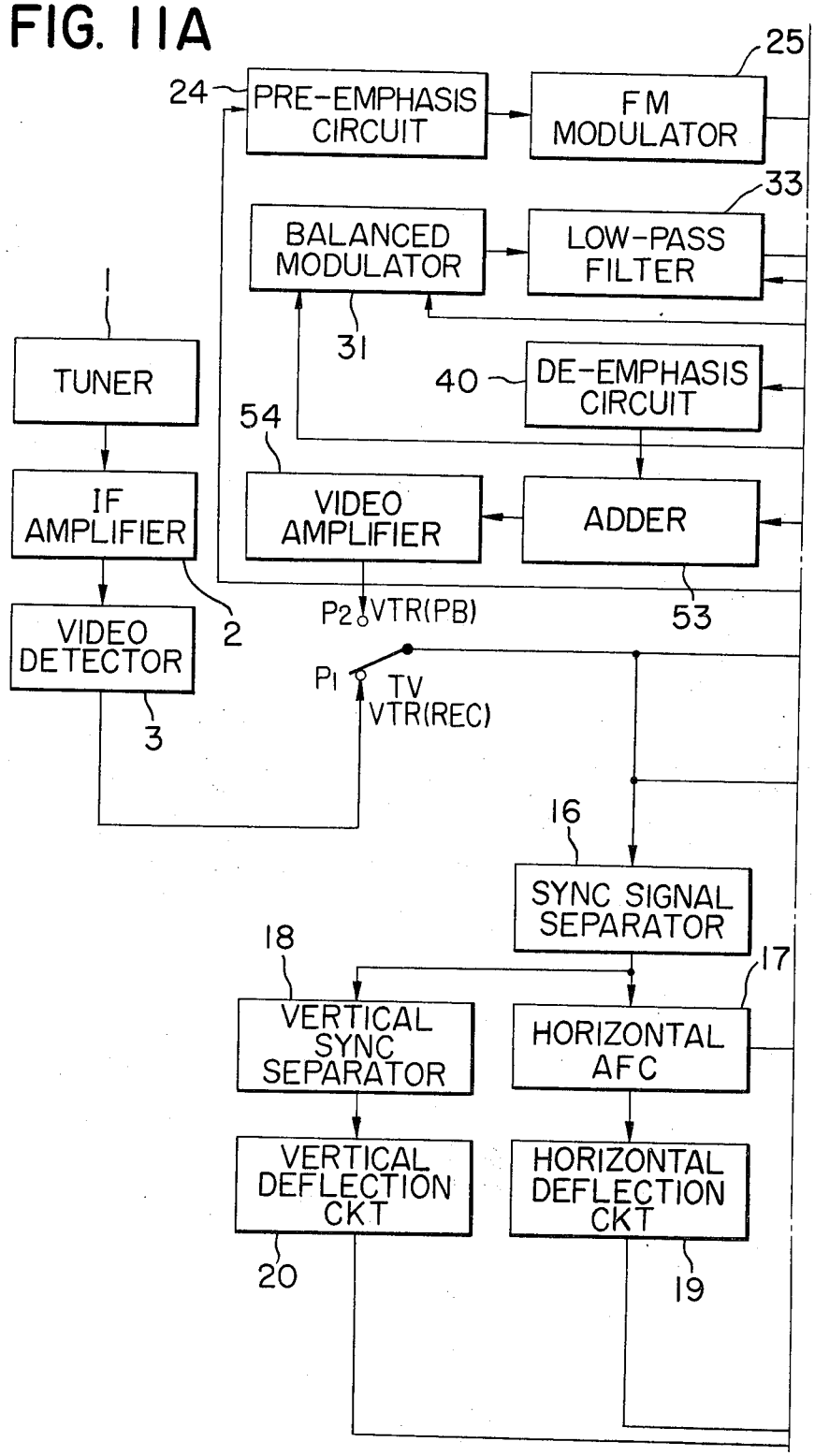
Figure 11B:
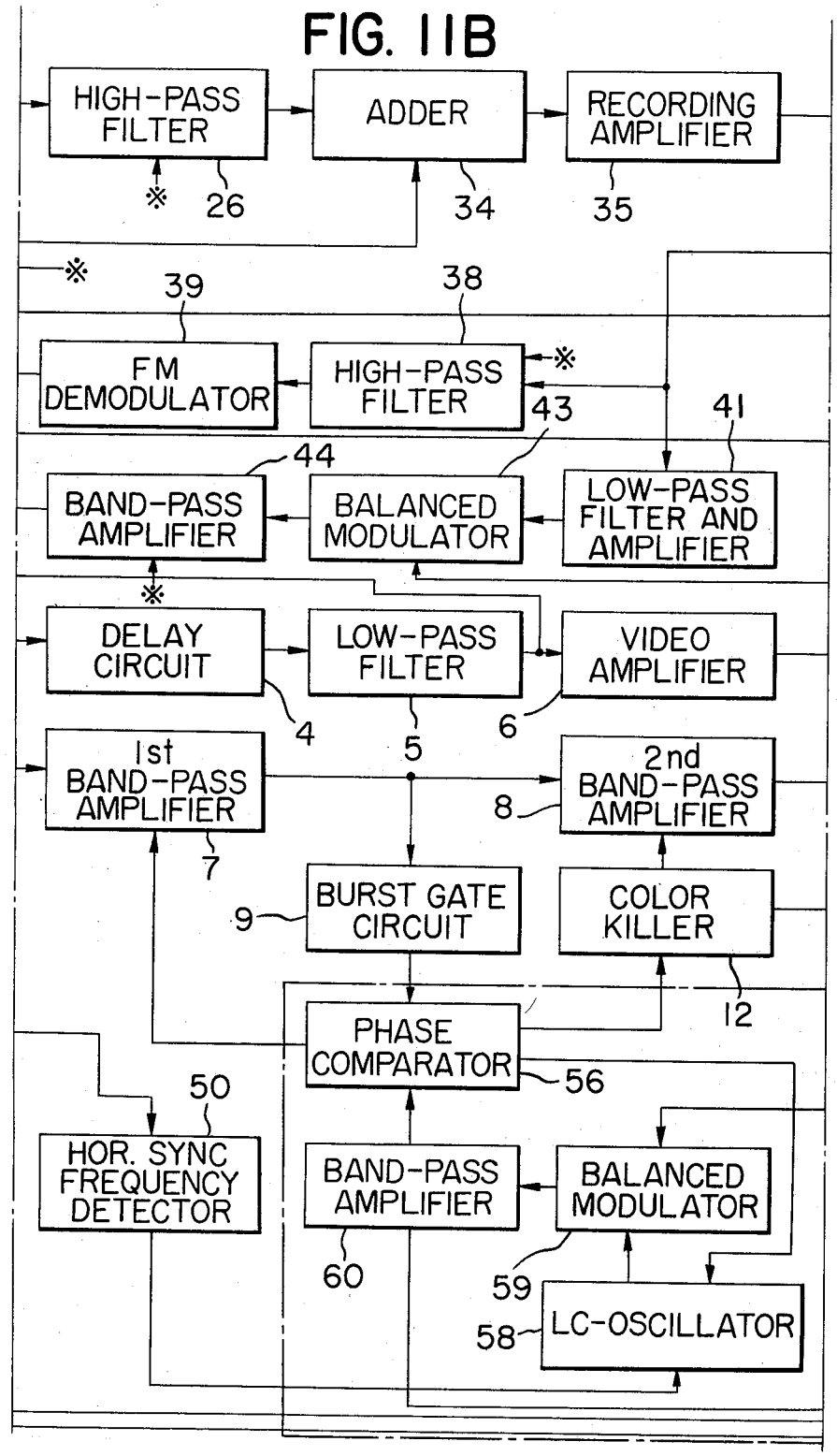

Next referring to FIG. 11, the first variation of the second embodiment in accordance with the present invention will be described. The first variation is substantially similar in construction to the second embodiment except that the arrangement of the APC circuit generally indicated by the reference numeral 10. In general in the conventional APC circuit with a crystal oscillator, Q of a crystal oscillator is quite high so that the pull-in range is very narrow as described above. In case of an LC-oscillator the theoretical pull-in range is ± 7.8 KHz (½ $f_H$). However the APC circuits used in the color television receivers are required not only to be capable of functioning in synchronism with the burst signal but also to have an excellent phase lock-in characteristic. When the oscillation frequency of the variable frequency oscillator deviates by 100 Hz from the frequency of the burst signal, the phase deviation is of the order of 2 deg. If the phase deviation is in excess of 2 deg., the result is the wrong or incorrect hues. The phase locking-in characteristic of the APC circuit may be improved by increasing the loop gain thereof. In case of the crystal APC circuit, the loop gain $\mu\beta$ is of the order of 2 kHz/volt while the APC circuit with an LC-oscillator has a loop gain of the order of 60 kHz/volt. This means that the APC circuit with an LC-oscillator has a loop gain about 30 times as much as the crystal APC circuit. Since the phase locking-in characteristic of the APC circuit is, in general, proportional to the loop gain thereof, when the frequency of the variable LC-oscillator deviates from the frequency of the burst signal, the phase deviation is of the order of 2 deg. If an LC-oscillator of 3.58 MHz is used as a variable frequency oscillator in the APC circuit 10 in FIG. 11, its temperature stability is of the order of $10^{-3}$ at the most which corresponds to the frequency deviation of about 3.5 kHz. This corresponding frequency deviation would increase to the order of 10 kHz due to the production variation when the LC-oscillators are mass-produced. Thus the phase locking-in characteristic of the LC-oscillator is in general not satisfactory.

To overcome the above problem, according to the present invention, the APC circuit 10 includes an LC-oscillator 58 with an oscillation frequency of 767 kHz. The output of the crystal oscillator 32 with an oscillation frequency of 4.34 MHz and the output of the LC-oscillator 58 are modulated in a balanced modulator 59, and the difference frequency 3.58 MHz thereof is derived from a band-pass amplifier 60. The output of the amplifier 60 is compared in a phase comparator 56 with the burst signal. Thus according to the present invention the oscillation frequency of the LC-oscillator 58 may be reduced about 1/5 of 3.58 MHz so that the deviation in frequency due to temperature variation may be made within ± 2kHz even when the production variation is taken into consideration. Therefore the phase locking-in characteristic of the LC-oscillator may be improved to correspond to that of the crystal oscillator. Because of the unique arrangemment of the APC circuit in accordance with the present invention, the crystal oscillator of 3.58 MHz may be eliminated, only one APC circuit suffice, and three switches may be eliminated. The time constant of a hold circuit for the APC circuit may be easily varied depending upon the television reception mode or VTR reproduction mode. Furthermore, the operation of the killer may be further stabilized. When the VTR is automatically switched from the color mode to the monochromatic mode or vice versa in the recording or reproduction mode of VTR, a killer detector must be provided in the recording circuit. However because of the poor S/N ratio of the picture signal processed in the VTR and by virtue of the FM carrier residue, the mere detection of the level of the burst signal tends to cause the erratic operation of the killer circuit. However, according to the present invention the killer circuit is actuated in response to the stable detection signal derived by the detection of both phase and amplitude as with the case of the killer in the color television receiver. Therefore the stable switching between the color mode and the monochrome mode may be ensured.

Figure 13:
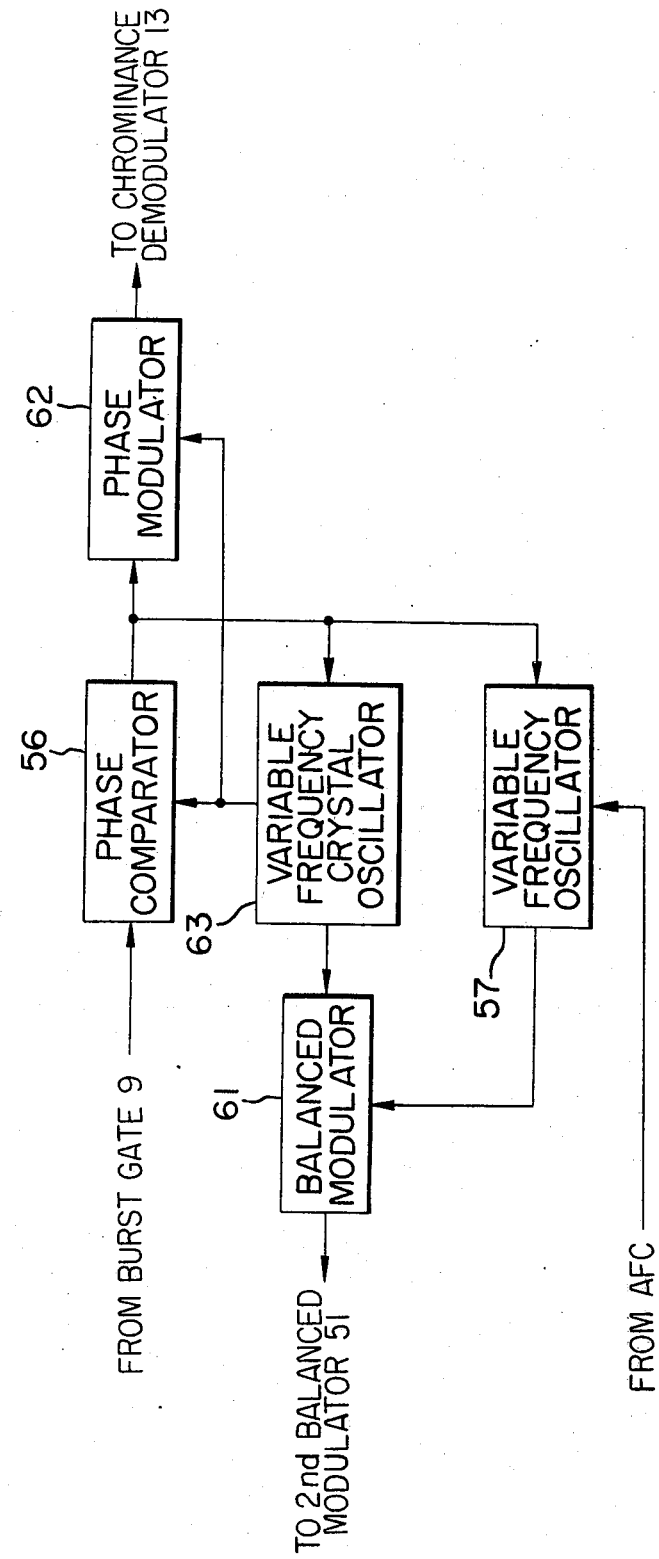
FIGS. 13, 14 and 15 are block diagrams of variations or modifications, respectively, of a section generally indicated by 10 in FIG. 11.

Next referring to FIG. 13 the second variation of the second embodiment of the present invention will be described hereinafter. The phase comparator 56 compares the burst signal with the output or the chrominance subcarrier frequency signal of 3.58 MHz from the crystal variable frequency oscillator 63 so that a crystal variable oscillator 63 of 3.58 MHz may be controlled in response to the output of the phase comparator 56. In like manner the variable frequency oscillator 57 is also controlled. The outputs from the oscillators 63 and 57 are hetereodyned by the balanced modulator 61 and applied to the balanced modulator 51 (See FIG. 4). Then the picture in color may be produced, but the deviation in hue is much pronounced. Therefore according to the present invention the phase modulator 62 is provided to phase-modulate the output of the crystal oscillator 63 of 3.58 MHz by the output of the phase comparator 56. The output of the phase modulator 62 is applied to the chrominance demodulator 13.

Thus the existing oscillator 63 may be made of full use. According to the experiments conducted by the inventors, the phase locking-in characteristic was very satisfactory.

Figure 14:
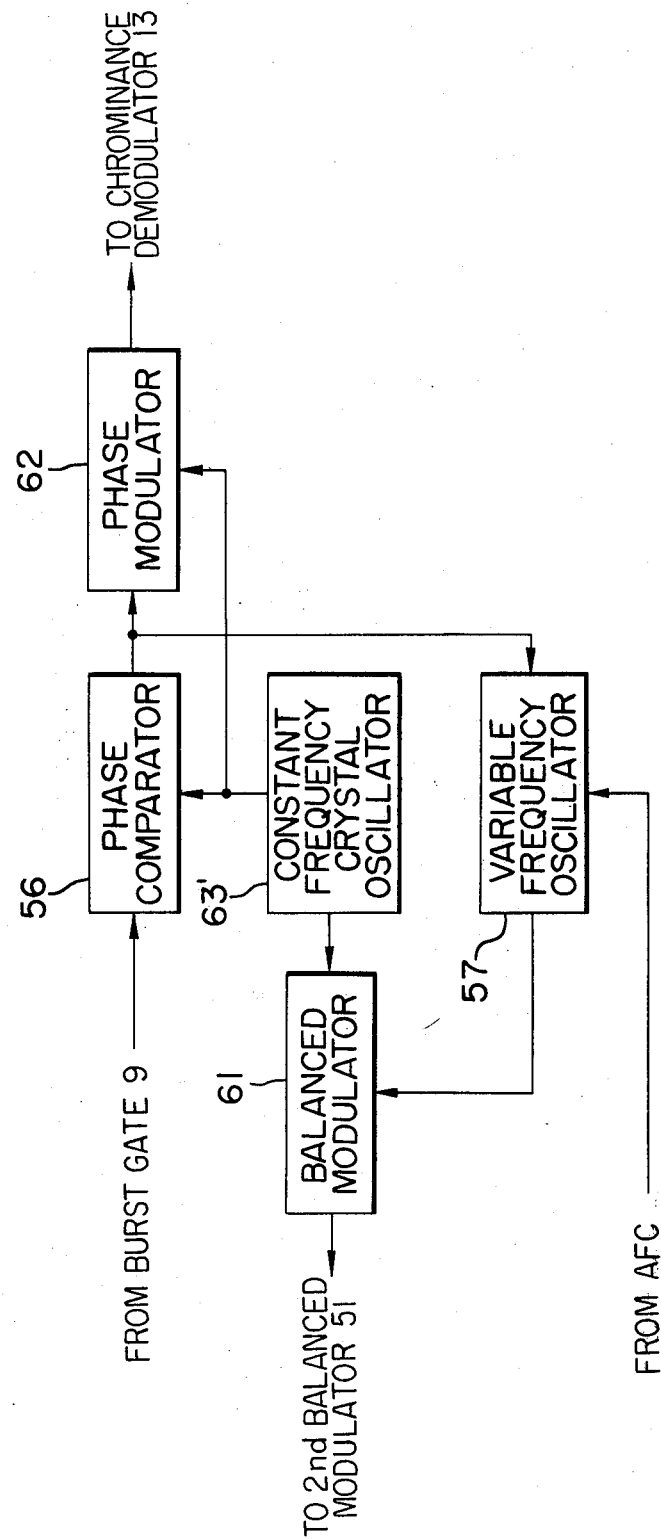

Next referring to FIG. 14 the third variation of the second embodiment in accordance with the present invention will be described hereinafter. The phase locking-in characteristic may be further improved by the third variation, which comprises the phase comparator 56, the variable frequency oscillator 57, the balanced modulator 61, the phase modulator 62, and the crystal oscillator 63' with an oscillation frequency of 3.58 MHz.

Figure 15:
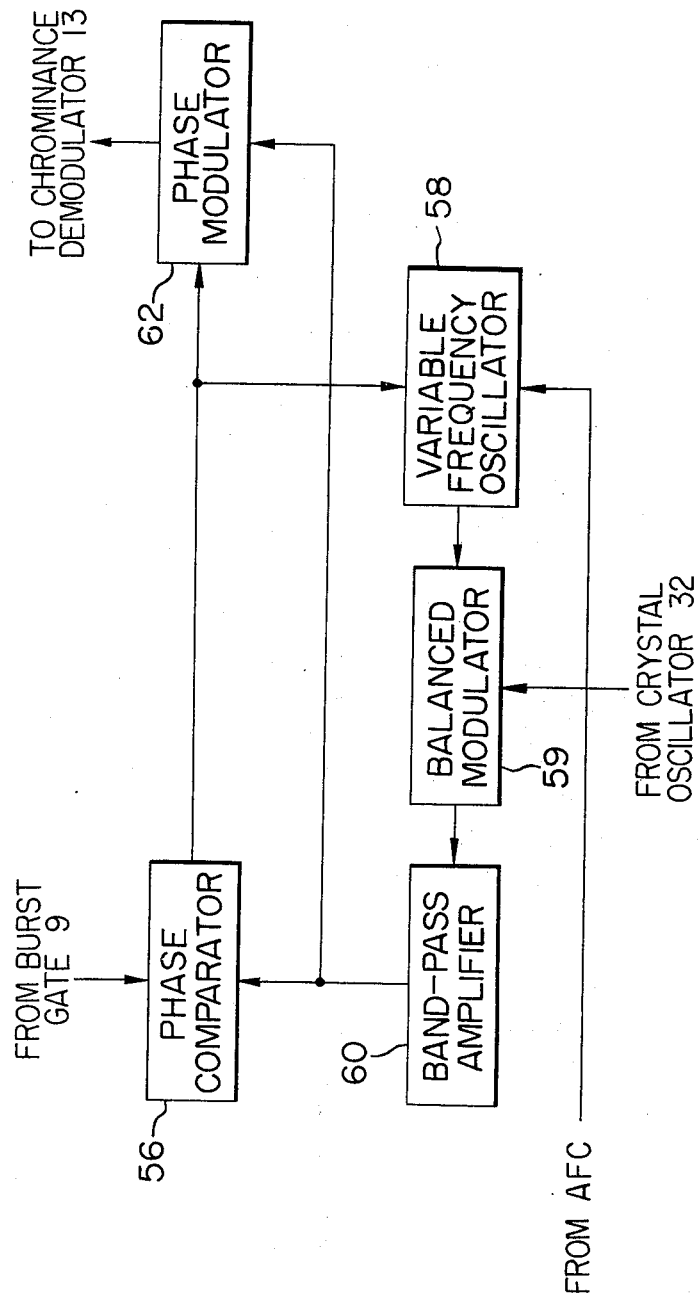

In order to further improve the phase locking-in characteristic of the APC circuit, the fourth variation of the second embodiment in accordance with the present invention may be used which is shown in block diagram in FIG. 15 as comprising the phase comparator 56, the variable frequency oscillator 58, the balanced modulator 59 for hetereodying the outputs from the variable frequency oscillator 58 and the crystal oscillator 32, the band-pass amplifier 60 with the band-path centered at 3.58 MHz, and the phase modulator 62.

Third Embodiment, FIG. 12

The third embodiment shown in block diagram in FIG. 12 is substantially similar in underlying principle to the fourth variation of the first embodiment shown in FIG. 8 in that the reproduced luminance signal and the chrominance signal are individually applied to the color television receiver so that only one low-pass filter 5 may be used for limiting the band of the luminance signal. Another advantage of the third embodiment is that the low-pass filter 5 may be so designed as to trap only 3.58 MHz. Therefore the resolving power of the luminance signal may be considerably improved, and the phase distortion due to the limit on the bandwidth may be eliminated.

In FIG. 12, switches SW$_7$ and SW$_8$ are switched to close the contacts P$_1$ in the television reception mode as well as in the VTR recording mode while they are switched to close the contacts P$_2$ in case of the reproduction mode.

In the third instant embodiment, the luminance signal is shown as being derived from the low-pass filter 5, but it is understood that is may be derived from the video amplifier 6.

As described hereinbefore, according to the present invention the organic combination of a color television receiver and a color VTR may be provided with some of their circuits being used in common in both television receiver and VTR so that the cost may be remarkably reduced. When a handy television camera with a small power consumption type transmitter is used, the picture picked up by and transmitted from the camera may be reproduced and recorded. Therefore the present invention may also provide a wireless television monitor and recording and reproducing equipment.

Referring back to FIG. 4, a third contact P$_3$ may be provided in the switch SW$_3$ and connected to an external input terminal 64. Then, not only the picture received by the television receiver but also the picture from a television camera, another VTR of flying spot scanner may be recorded. Therefore, the recording of home-made television picture, the editing of VTR tapes, the insertion of caption into the received picture, and so on may become possible. The color television signal recording-reproducing equipment with a monitor in accordance with the present invention may be produced at a low cost for semi-professional uses, is simple in operation, and can receive the television programs transmitted from various stations.

What is claimed is:

1. An equipment for recording and reproducing color television signals comprising
   a. a tuner for selecting any receiving channel desired,
   b. a first detector means for detecting the color television signal which has been converted into an intermediate frequency signal by said tuner,
   c. luminance signal processing circuits for separating the luminance signal from the detected color video signal and for processing said separated luminance signal,
   d. chrominance signal processing circuits for separating the carrier chrominance signal from said detected color video signal and processing said separated carrier chrominance signal;
   e. a continuous-wave signal generator circuit for producing a continuous wave signal in phase synchronizm with the burst signal in said carrier chrominance signal,
   f. a second detector means for phase detecting said carrier chrominance signal with said continuous wave signal;
   g. a matrix circuit to which is applied the output from said second detector means and the output from said luminance signal processing circuits,
   h. a picture tube for displaying the picture from the outputs from said matrix circuit,
   i. means for extracting the luminance signal from said luminance signal processing circuits and for frequency modulating said extracted luminance signal,
   j. a stable oscillator and a first modulator means for extracting the carrier chrominance signal from said carrier chrominance signal processing circuits and for heterodyning the extracted carrier chrominance signal with the output of a stable oscillator to convert the carrier chrominance signal into a low-frequency chrominance signal,
   k. means for recording and reproducing the color television signal by combining said frequency-modulated luminance signal with said low-frequency chrominance signal,
   l. separator means for separating said frequency modulated luminance signal and said low-frequency chrominance signal from the reproduced a signal output of said recording-reproducing means,
   m. a third detector means (39) for frequency demodulating said separated frequency modulated luminance signal,
   n. a second modulator means (51) for reconverting said separated low-frequency chrominance signal into the carrier chrominance signal with the initial frequency band, by the aid of the signal of a predetermined frequency,
   o. a first connecting means for connecting, in the recording mode, the output of said first detector means to said luminance signal processing circuit and in the reproduction mode, the output of said third detector means to said luminance signal processing circuits,
   p. a second connecting means for connecting, in the recording mode, the output of said first detector means to said carrier chrominance signal processing circuits and in the reproduction mode, the output of said second modulation means to said carrier chrominance signal processing circuits, q. a phase comparator means for detecting the phase difference between said burst signal and said continuous wave signal to produce an error signal, and r. a variable frequency oscillator means controlled by said error signal, for producing said signal of predetermined frequency.

2. An equipment for recording and reproducing color television signal as set forth in claim 1 wherein:
said signal of a predetermined frequency used in conjunction with said second modulation means is the signal in synchronism with the burst signal contained in said carrier chrominance signal.

3. An equipment for recording and reproducing color television signal as set forth in claim 2 wherein:
said signal in synchronism with said burst signal is the output of said variable frequency oscillator which is controlled in response to the signal representing the difference in phase between the output from said continuous wave signal generator circuit which is synchronized with and said burst signal.

4. An equipment for recording and reproducing color television signal as set forth in claim 2 wherein:
said signal in synchronism with said burst signal is the sum of the output from said continuous wave signal generator means which is in synchronism with said burst signal and the output of said variable frequency oscillator which is controlled in response to the signal representing the difference in phase between the output of said continuous wave signal generator means and said burst signal.

5. An equipment for recording and reproducing color television signal as set forth in claim 1 wherein:
said continuous wave signal generator circuit comprises two circuits with different response characteristics, one of which is selectively driven when said first and second selection switching means are switched.

6. An equipment for recording and reproducing color television signals comprising:
a. a tuner for selecting any receiving channel desired,
b. a first detector means for detecting the color television signal which has been converted into an intermediate frequency signal by said tuner,
c. luminance signal processing circuit for separating the luminance signal from the detected color video signal and for processing said separated luminance signal,
d. chrominance signal processing circuits for separating the carrier chrominance signal from said detected color video signal and processing said separated carrier chrominance signal,
e. a continuous wave generator circuit for producing a continuous wave signal in phase synchronism with the burst signal in said carrier chrominance signal,
f. a second detector means for phase detecting said carrier chrominance signal with said continuous wave signal,
g. a matrix circuit connected to receive the output of said second detector means and the output of said luminance signal processing circuits,
h. a picture tube for displaying the picture from the output of said matrix circuit,
i. means for extracting the luminance signal from said luminance signal processing circuits and for frequency modulating said extracted luminance signal, j. a stable oscillator, k. a first modulator means for extracting the carrier chrominance signal from said carrier chrominance signal processing circuits and for heterodyning the extracted carrier chrominance signal with the output of said stable oscillator to convert the carrier chrominance signal into a low-frequency chrominance signal, l. means for recording and reproducing the color television signal by combining said frequency modulated luminance signal with said low-frequency chrominance signal, m. separator means for separating said frequency modulated luminance signal and said low-frequency chrominance signal from the reproduced signal output of said recording-reproducing means, n. third detector means for frequency demodulating said separated frequency modulated luminance signal, o. a second modulator means connected to said stable oscillator for reconverting said separated low-frequency chrominance signal, p. a first connecting means for connecting, in the recording mode, the output of said first detector means to said luminance signal processing circuits and in the reproduction mode, the output of said third detector means to said luminance signal processing circuits, q. a second connecting means for connecting, in the recording mode, the output of said first detector means to said carrier chrominance signal processing circuits and, in the reproduction mode, the output of said second modulation means to said carrier chrominance signal processing circuits, r. a phase comparator means, said continuous wave signal generator circuit comprising s. an oscillator whose oscillation frequency is controlled in response to the output of said phase comparator means, t. modulating means connected to said stable oscillator for frequency converting the output from said phase comparator means into a signal with a higher frequency band, and u. means for applying the output from said modulating means and the burst signal to said phase comparator means as the signals to be compared with each other, the continuous wave signal being derived from said modulating means.

7. An equipment for recording and reproducing color television signal as set forth in claim 1 wherein:
said continuous wave generator circuit comprises an oscillator whose oscillation frequency is controlled in response to the output of said phase comparator means,
a phase modulation means for phase modulating the output of said oscillator with the output of said phase comparator, and
means for applying the output of said oscillator and the burst signal to said phase comparator means for phase comparison,
the continuous wave signal being derived from said phase modulation means.

8. An equipment for recording and reproducing color television signal as set forth in claim 1 wherein:
said continuous wave signal generator circuit comprises an oscillator, and
means for applying the burst signal and the output from said oscillator to said phase comparator means as the signals to be compared with each other, the continuous wave signal being derived from said phase comparator means.

9. An equipment for recording and reproducing color television signal as set forth in claim 1 wherein:
said continuous wave signal generator circuit comprises an oscillator whose oscillation frequency is controlled in response to the output from said phase comparator means,
a modulation means for modulating the output from said oscillator with the signal of predetermined frequency into the signal of a higher frequency band,
means for phase modulating the output of said modulation means with the output from said phase comparator means, and means for applying the burst signal and the modulated signal to said phase comparator means as the signals to be compared with each other, the continuous wave signal being derived from said phase modulating means.

* * * * *

UNITED STATES PATENT OFFICE
CERTIFICATE OF CORRECTION

Patent No. 3,969,755     Dated July 13, 1976

Inventor(s) Ichiro Arimura, et al

It is certified that error appears in the above-identified patent and that said Letters Patent are hereby corrected as shown below:

In the Abstract of the Disclosure on line 11: "selction" should be --selection--.

Column 2, line 13: after "VTR", insert -- section --.

line 14: "monitored" should be --monitoring--.

line 33: "annd" should be --and--.

Column 4, line 2: "PBA" should be --BPA--.

Column 5, line 46: "classes" should be --closes--.

Column 6, line 26: "$SW_2$" should be --$SW_3$--.

Signed and Sealed this

Fourth Day of January 1977

[SEAL]

Attest:

RUTH C. MASON
Attesting Officer

C. MARSHALL DANN
Commissioner of Patents and Trademarks